United States Patent
Tsuruta

(10) Patent No.: US 7,546,722 B2
(45) Date of Patent: Jun. 16, 2009

(54) VERTICAL FILLING-PACKAGING MACHINE AND METHOD OF MANUFACTURING PACKAGING BAG

(75) Inventor: Orihiro Tsuruta, Takasaki (JP)

(73) Assignee: Orihiro Engineering Co., Ltd., Takasaki-shi, Gunma (JP)

( * ) Notice: Subject to any disclaimer, the term of this patent is extended or adjusted under 35 U.S.C. 154(b) by 244 days.

(21) Appl. No.: 11/568,441

(22) PCT Filed: Mar. 22, 2005

(86) PCT No.: PCT/JP2005/005091

§ 371 (c)(1),
(2), (4) Date: Oct. 27, 2006

(87) PCT Pub. No.: WO2005/105578

PCT Pub. Date: Nov. 10, 2005

(65) Prior Publication Data

US 2008/0041023 A1 Feb. 21, 2008

(30) Foreign Application Priority Data

Apr. 30, 2004 (JP) .............................. 2004-135826
Apr. 30, 2004 (JP) .............................. 2004-135827

(51) Int. Cl.
*B65B 9/06* (2006.01)
*B65B 51/32* (2006.01)

(52) U.S. Cl. ........................... 53/551; 53/552; 53/375.3

(58) Field of Classification Search ............... 53/451, 53/551, 552, 373.7, 374.8, 375.3, 375.6
See application file for complete search history.

(56) References Cited

U.S. PATENT DOCUMENTS

| 3,616,087 | A | * | 10/1971 | Henry et al. | ................ | 156/518 |
| 4,506,494 | A | * | 3/1985 | Shimoyama et al. | .......... | 53/551 |
| 4,622,798 | A | * | 11/1986 | Oki | ........................... | 53/374.8 |
| 4,656,818 | A | * | 4/1987 | Shimoyama et al. | .......... | 53/551 |
| 4,662,978 | A | * | 5/1987 | Oki | ........................... | 53/374.9 |
| 4,768,327 | A | * | 9/1988 | Mosher | ...................... | 53/551 |

(Continued)

FOREIGN PATENT DOCUMENTS

JP 57-1004 1/1982

(Continued)

*Primary Examiner*—Louis K Huynh
(74) *Attorney, Agent, or Firm*—Knobbe Martens Olson & Bear LLP

(57) ABSTRACT

A vertical filling-packaging machine is provided for satisfactorily forming a heat-sealed part by heat-sealing, cooling, and cutting a cylindrical film without moving the same and also for manufacturing a variety of packaging bags in different outline shapes. The vertical filling packaging device comprises a pair of flat part forming rollers disposed in opposition to each other across cylindrical film (60) for carrying cylindrical film (60) downward while forming flat part (60a) in cylindrical film (60), a sealing mechanism having heater bar (31) and heater bar receiver (32) for thermally sealing flat part (60a) in the width direction, a cutting mechanism disposed below the sealing mechanism and having a pair of cooling bars (34a, 34b) for cooling transversely sealed part (65) which has been thermally sealed, and cutter (35) for cutting transversely sealed part (65), and a drive mechanism for integrally holding the seal mechanism and the cutting mechanism and for integrally moving these mechanisms along the direction in which cylindrical film (60) is carried.

6 Claims, 15 Drawing Sheets

U.S. PATENT DOCUMENTS

| | | | | |
|---|---|---|---|---|
| 4,869,048 | A | * | 9/1989 | Boeckmann ................. 53/551 |
| 5,067,310 | A | * | 11/1991 | Yamanaka ................... 53/551 |
| 5,170,609 | A | * | 12/1992 | Bullock et al. ............... 53/551 |
| 5,241,804 | A | * | 9/1993 | Tsuruta et al. ................ 53/551 |
| 5,463,851 | A | * | 11/1995 | Nagai ........................ 53/374.8 |
| 6,212,861 | B1 | * | 4/2001 | Tsuruta ....................... 53/551 |
| 2002/0104292 | A1 | * | 8/2002 | Tsuruta ....................... 53/551 |

FOREIGN PATENT DOCUMENTS

| JP | 57-1005 | 1/1982 |
|---|---|---|
| JP | 60-204410 | 10/1985 |
| JP | 61-119907 U | 7/1986 |
| JP | 6-99916 | 4/1994 |
| JP | 7-172403 | 7/1995 |
| JP | 11-171107 | 6/1999 |
| JP | 11-348910 | 12/1999 |
| JP | 11-348911 | 12/1999 |
| JP | 2001-122209 | 5/2001 |
| JP | 2002-37205 | 2/2002 |
| JP | 2002-234504 | 8/2002 |
| JP | 2002-234504 A | 8/2002 |
| JP | 2002-526344 | 8/2002 |
| JP | 2002-302104 | 10/2002 |
| WO | WO 00/20279 | 4/2000 |

* cited by examiner

Prior Art

Fig. 3
Fig. 3A
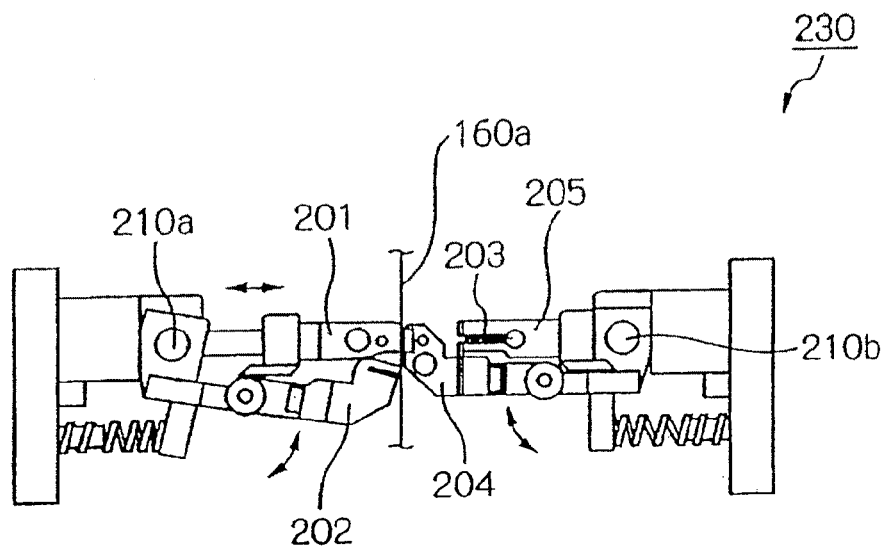
Fig. 3B
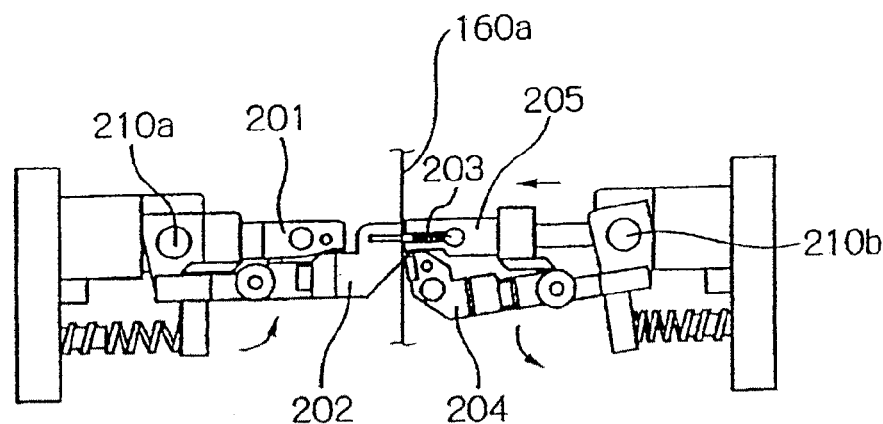
Prior Art

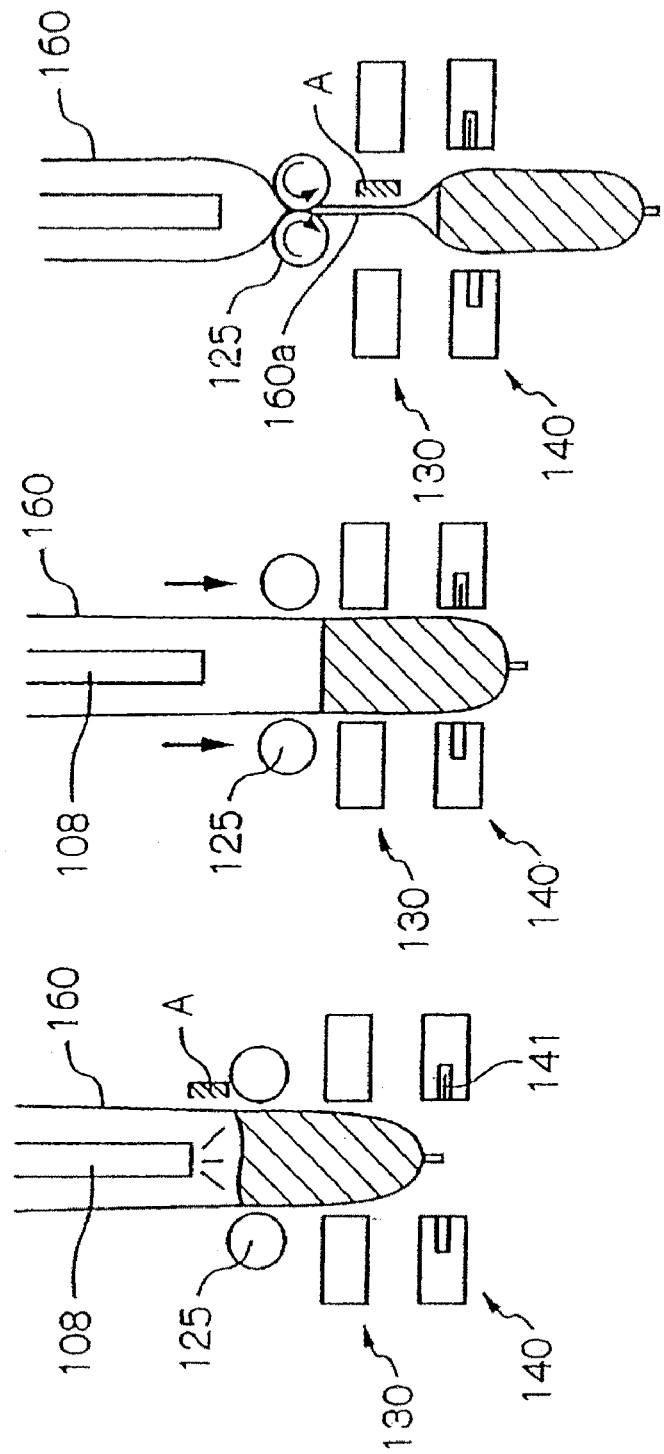

Fig. 6
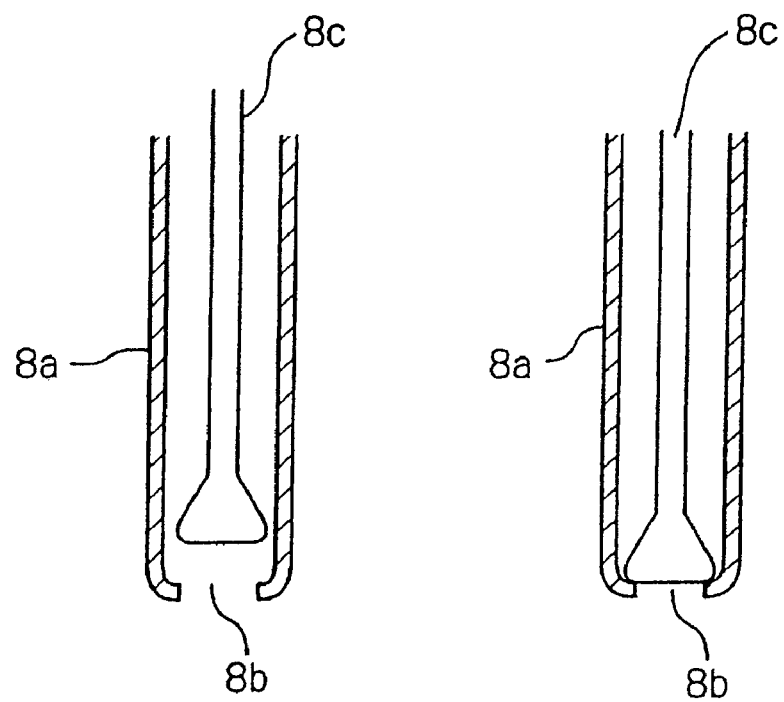
Fig. 6A            Fig. 6B
Fig. 7
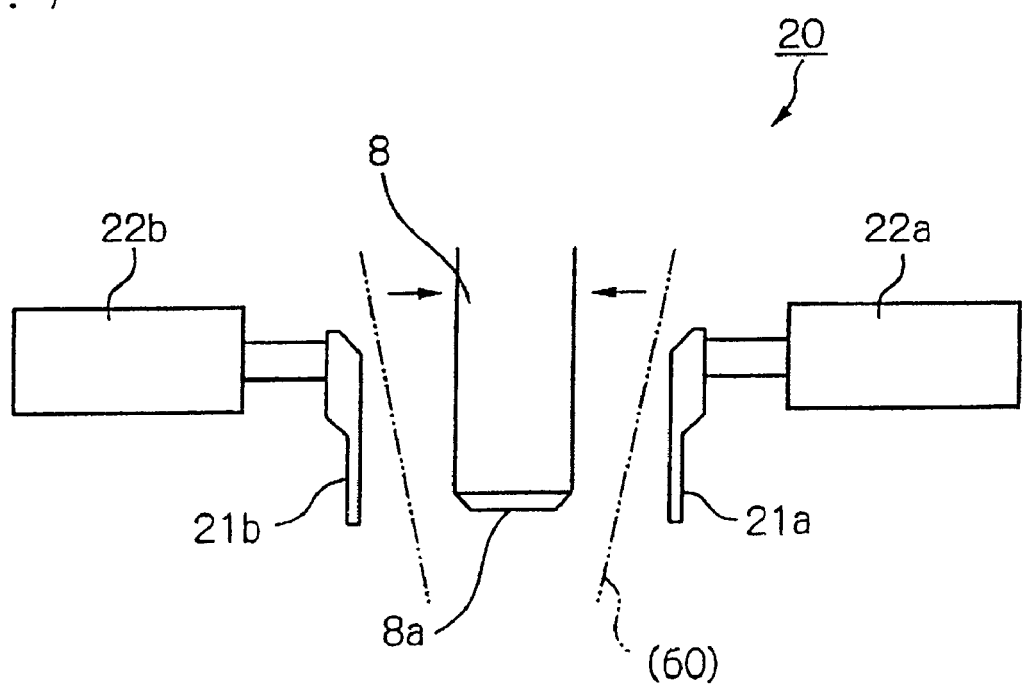

Fig. 13
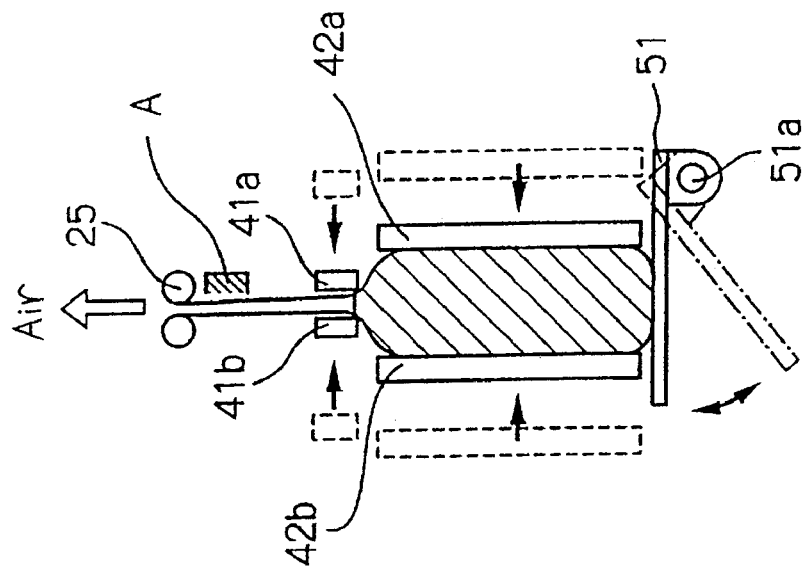
Fig. 13B
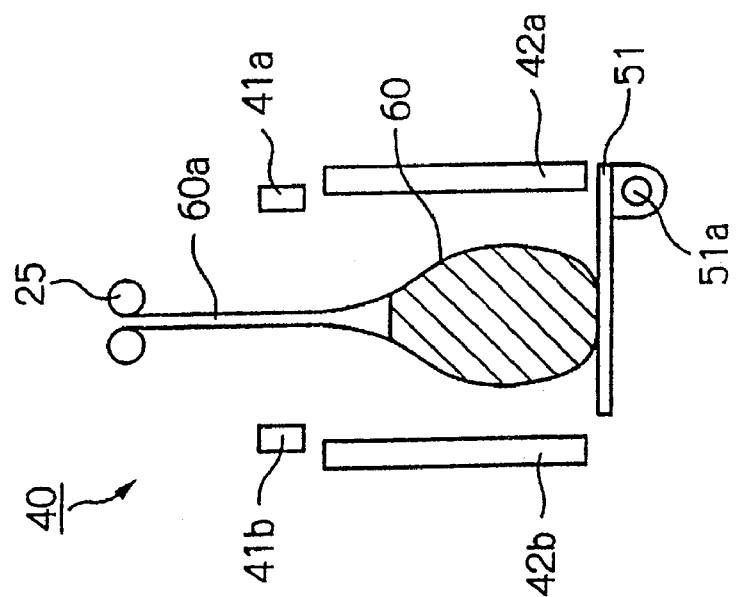
Fig. 13A

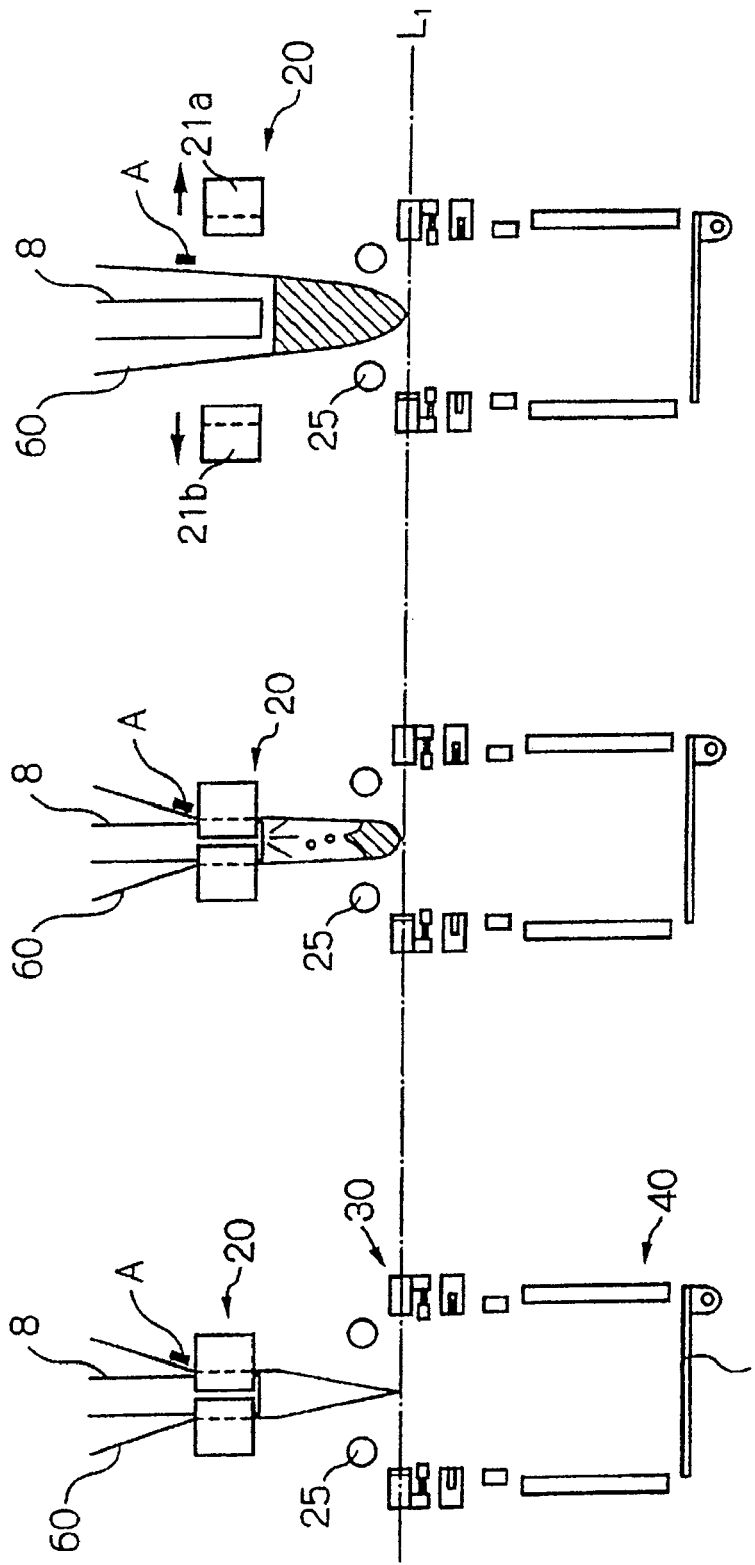

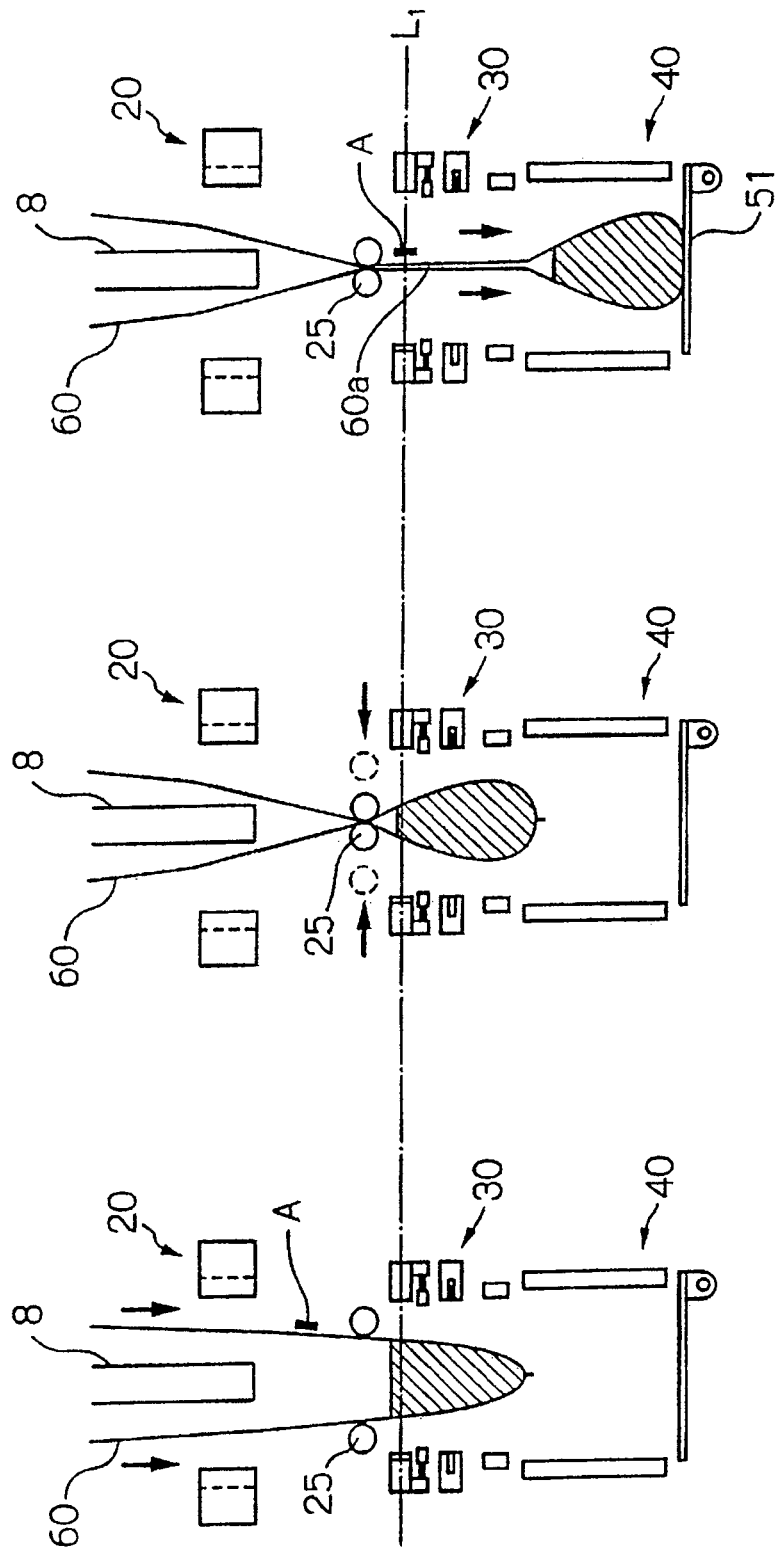

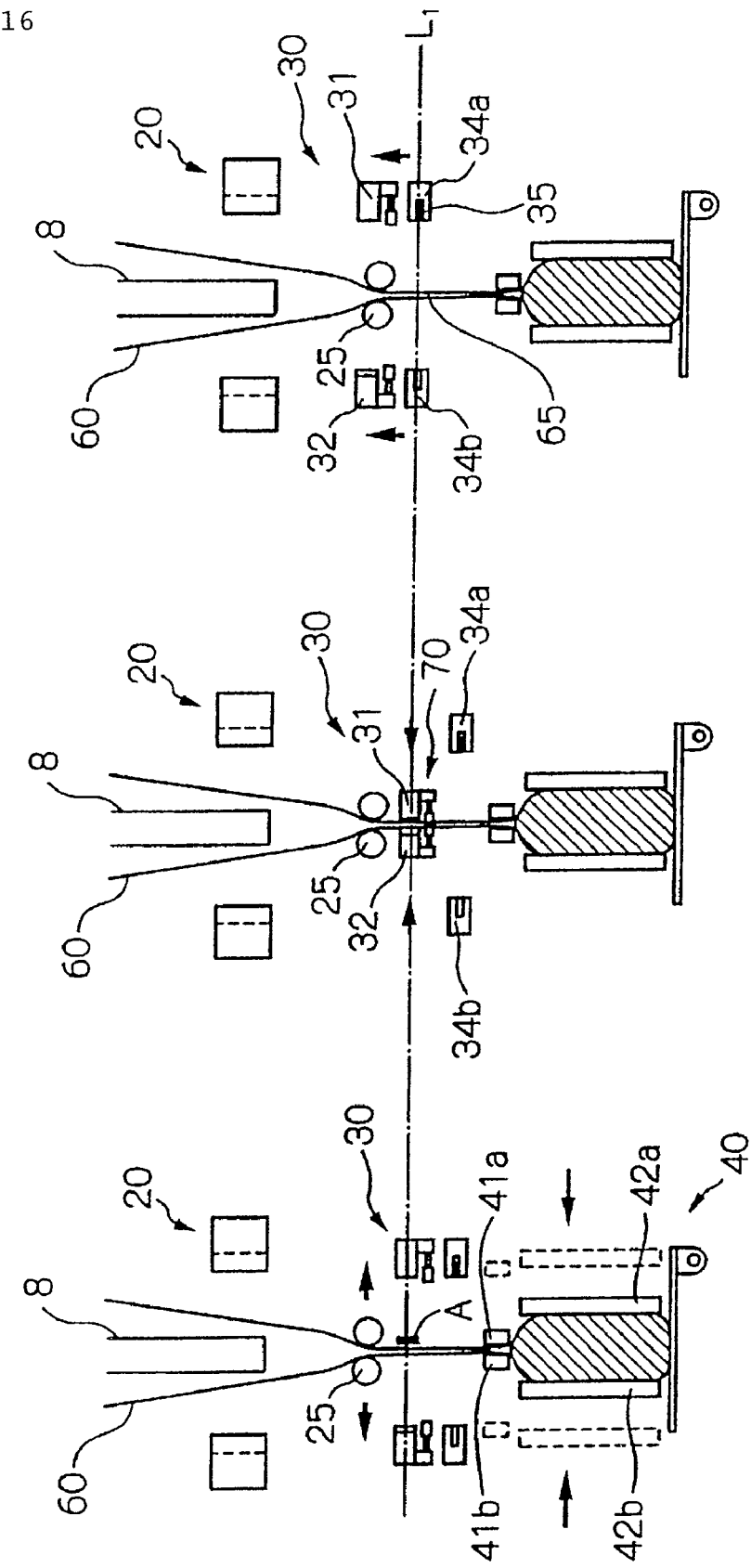

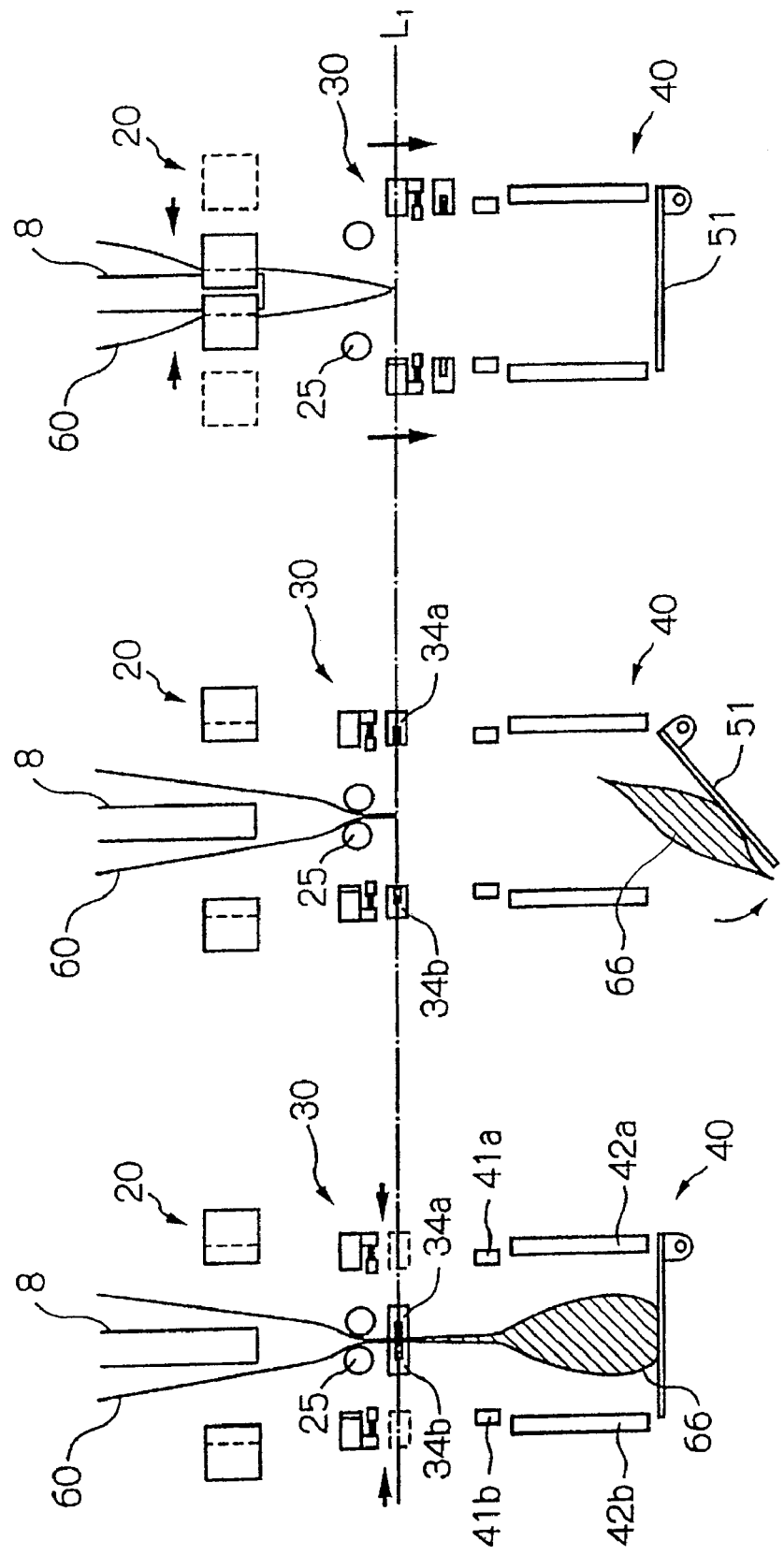

US 7,546,722 B2

VERTICAL FILLING-PACKAGING MACHINE AND METHOD OF MANUFACTURING PACKAGING BAG

TECHNICAL FIELD

This application is the U.S. National Phase under 35 U.S.C. § 371 of International Application PCT/JP2005/005091, filed Mar. 22, 2005, which claims priority to Japanese Patent Application No. 2004-135826, filed Apr. 30, 2004 and Japanese Patent Application No. 2004-135827, filed Apr. 30, 2004. The International Application was published under PCT Article 21(2) in a language other than English.

BACKGROUND ART

Conventionally, vertical filling-packaging machines have been used to package liquid or pasty fillers in bags (for example, see JP-Application No.-93-319708 which is JP Laid-open No. H07-172403).

FIG. 1 is a diagram illustrating an example of conventional vertical filling-packaging machines, which is shown in the foregoing document.

Vertical filling-packaging machine 101 forms a sheet-type film 161 into a cylindrical shape using back forming guide 105, and thermally seals matching surfaces of the cylindrical film using vertically sealing mechanism 106. Then, a filler is introduced into thus formed cylindrical film 160 to manufacture a packaging bag.

Vertical filling-packaging machine 101 comprises film feeding rollers 107 for carrying cylindrical film 160 downward; introduction nozzle 108 for introducing a filler into cylindrical film 160; a pair of ironing rollers 125 for squeezing cylindrical film 160 into a flat shape to form flat part 160a; transverse sealing mechanism 130 for thermally sealing flat part 160a in a width direction of cylindrical film 160; and cutting mechanism 140 which contains cutter 141 for cutting the transversely sealed part which has been thermally sealed by transverse sealing mechanism 130. The distance between transverse sealing mechanism 130 and cutting device 140 in a direction in which cylindrical film 160 is carried (vertical direction as shown in FIG. 1) is set to correspond to the length of one packaging bag to be manufactured. In this connection, the thermal sealing operation by thermal sealing mechanism 130 is also called "transverse sealing."

Exemplary operations of vertical filling-packaging machine 101 configured in this way will be described with reference to FIG. 2.

In a state illustrated in FIG. 2A, a pair of ironing rollers 125, transverse sealing mechanism 130, and cutting mechanism 140 remain in an open state. Also, one packaging bag 166 has already been formed below cylindrical film 160. A filler is being continuously introduced into cylindrical film 160 from introduction nozzle 108 (see FIG. 1).

Next, as illustrated in FIG. 2B, as the level of the filler exceeds the position of ironing rollers 125, cylindrical film 160 is nipped by ironing rollers 125 to divide the filler.

Next, as illustrated in FIG. 2C, ironing rollers 125 are driven to rotate with cylindrical film 160 remaining nipped, thereby carrying cylindrical film 160 downward while forming flat part 160a in cylindrical film 160. This carrying operation is continued until transversely sealed part 165, which has been thermally sealed in the previous step, reaches a position at which it is sandwiched by cutting mechanism 140.

Next, as illustrated in FIG. 2D, transverse sealing mechanism 130 and cutting mechanism 140 are driven while the carriage of cylindrical film 160 is stopped. Transversely sealing mechanism 130 nips flat part 160a formed by a pair of ironing rollers 125 to form transversely sealed part 165 in the width direction of cylindrical film 160. Cutting mechanism 140, in turn, nips transversely sealed part 165 thermally sealed in the previous step to cool transversely sealed part 165 in which heat still remains, and advances cutter 141 to cut transversely sealed part 165 in the width direction. In this way, packaging bag 166 is cut off from cylindrical film 160.

Next, as illustrated in FIG. 2E, a pair of ironing rollers 125, transverse sealing mechanism 130 and cutting mechanism 140 are all brought into an open state. By opening cutting mechanism 140, the holding state by cutting mechanism 140 is released to provide one packing bag 166.

Then, film feeding rollers 107 (see FIG. 1) are driven to again carry cylindrical film 160 until the state shown in FIG. 2A appears. By repeating a series of steps as described above, packing bags 166 filled with the filler are manufactured in sequence.

After forming transversely sealed part 165 in cylindrical film 160 using transverse sealing mechanism 130 in this way, vertical filling-packing machine 101 of FIG. 1 again carries cylindrical film 160 downward, and cools and cuts transversely sealed part 165 by using cutting mechanism 140.

Japanese Patent No. 2598879, for example, has proposed a mechanism which is capable of fully performing operations for thermally sealing, cooling and cutting cylindrical film 160 while the carriage of the film is stopped.

FIG. 3 is a diagram for describing the configuration and operation of a conventional sealing and cuffing mechanism proposed in Japanese Patent No. 2598879.

As illustrated, transverse sealing and cutting mechanism 230 comprises heater bar 201 and heater bar receiver 204 for thermally sealing flat part 160a of a cylindrical film in its width direction, and comprises cooling bar 202 and cutting device 205 for cooling and cutting a transversely sealed part that is thermally sealed by heater bar 201 and heater bar receiver 204.

Heater bar 21 and cutting device 205 are driven by a power source, for example, an air cylinder, and are configured to advance and retract in directions perpendicular to flat part 160a. Cooling bar 202 and heater bar receiver 204 in turn are pivotably supported by supporting shafts 210a, 210b, respectively, and are configured to pivotally move about supporting shafts 210a, 210b in step with advancing and retracting movements of heater bar 201 and cutting device 205, specifically, when cooling bar 202 is not in contact with flat part 160a, as illustrated in FIG. 3A, when heater bar 201 is advanced, and is in contact with flat part 160a, as illustrated in FIG. 3B and when heater bar 201 is retracted. Heater bar receiver 204 in turn is in contact with flat part 160a, as illustrated in FIG. 3A, when cuffing device 205 is retracted, and is not in contact with flat part 160a, as illustrated in FIG. 3B, when cutting device 205 is advanced.

Transversely sealing and cutting mechanism 230 configured as described above advances heater bar 201 and retracts cutting device 205, as illustrated in FIG. 3A, to apply pressure and heat to flat part 160a by using heater bar 201 and heater bar receiver 204, thereby thermally sealing flat part 160a to form a transversely sealed part. Subsequently, as illustrated in FIG. 3B, heater bar 201 is retracted, and cutting device 205 is advanced to sandwich flat part 160a between cutting device 205 and cooling bar 202 to cool the transversely sealed part in which heat still remains. After this cooling operation has been performed for a predetermined time, cutter 203 provided in cutting device 205 is advanced to cut the cooled transversely sealed part.

A vertical filling-packaging machine that uses such transverse sealing and cutting mechanism 230 to manufacture packaging bags provides the following advantages, since the thermal sealing, cooling, and cutting operations can be fully carried out while the cylindrical film is stopped.

Vertical filling-packaging machine 101 shown in FIG. 1, after performing a thermal sealing operation, again carries the cylindrical film downward until transversely sealed part 165 formed thereby reaches the height of cutting mechanism 140. Therefore, a large sealing width must be used in consideration of variations in the amount of fed cylindrical film. However, when transverse sealing and cutting mechanism 230 is used, the sealing width can be reduced because such variations need not be taken into consideration. A large sealing width means that extra cylindrical film is used, leading to an increase in the manufacturing cost of packing bags as products. Next, since transverse sealing and cutting mechanism 230 need not carry the cylindrical film downward as described above, and can therefore reduce the time required for thermal sealing, cooling, and cutting operations, the packing bag manufacturing operation can therefore be performed at higher speeds Other exemplary operations of vertical filling-packing machine 101 will be described with reference to FIG. 4.

First, as illustrated in FIG. 4A, a filler from introduction nozzle 108 is filled into cylindrical film 160, the lower end of which is thermally sealed. As illustrated, the lower end of cylindrical film 160 is at a position at which a packaging bag manufactured in the preceding manufacturing step was cut off, and is at the same height as the cuffing edge of cutter 141. Also, area A, which is to be thermally sealed in a transverse sealing step, later described, is positioned above ironing rollers 125.

Next, as illustrated in FIG. 4B, cylindrical film 160 is carried downward until the level of the filler falls below ironing rollers 125.

Next, as illustrated in FIG. 4C, cylindrical film 160 is nipped by a pair of ironing rollers 125 in an area above the level of the filler, and ironing roller 125 are driven to rotate. Consequently, the cylindrical film is carried downward while flat part 160a is formed. This carrying operation is performed until area A, which is to be thermally sealed, reaches the height of transverse sealing mechanism 130.

Subsequently, cylindrical film 160 is thermally sealed in its width direction using thermal sealing mechanism 130, cylindrical film 160 is again carried downward, and cylindrical film 160 is cut by using cutting mechanism 140, thereby manufacturing one packaging bag.

DISCLOSURE OF THE INVENTION

Problems to be Solved by the Invention

However, although the advantages as described above are provided by using transverse sealing and cutting mechanism 230 as in FIG. 3, the transverse sealing mechanism and cutting mechanism must be integrally assembled into a single unit for this purpose. Since this requirement causes limitations to the shape of heater bar 201 and cooling bar 202, difficulties are encountered, for example, in exchanging heater bar 201 with another type one. In the manufacturing of packaging bags, heater bar 201 and cooling bar 202 must be interchanged that, in some cases, depends on the shape of packaging bags to be manufactured and the material of the cylindrical film. It is therefore desirable that the vertical filling-packaging machine be configured such that a variety of types of heater bars 201 and cooling bars 202 can be mounted therein in view of the capabilities to manufacture a variety of types of packaging bags in different outline shapes.

On the other hand, the use of transverse sealing and cutting mechanism 230 to fully perform thermal sealing, cooling, and cutting operations without moving the cylindrical film can produce such effects as a reduction in the sealing width and higher operation speeds, as described above, so that it is preferable to have a vertical filling-packaging machine capable of manufacturing such packaging bags.

It is therefore a first object of the present invention to propose a vertical filling-packaging machine which is capable of satisfactorily forming a transversely sealed part by thermally sealing, cooling, and cutting a cylindrical film without moving the same, and is further capable of manufacturing a variety of types of packaging bags in different outline shapes.

Incidentally, when the packing machine of FIG. 1 is operated such that a pair of the ironing rollers nip an area of the cylindrical film in which the filler exists (see FIG. 2), the flat part, substantially free of the filler, can be relatively satisfactorily formed. However, as long as the ironing rollers nip an area in which the filler exists, it is difficult to completely remove the filler from the flat part. This is because some filler remains in the flat part due to the capillary phenomenon.

On the other hand, when a pair of ironing rollers 125 are operated to nip an area in which no filler exists, as illustrated in FIG. 4, no filler will remain in flat part 160a. However, when the filler is introduced into cylindrical film 160 as illustrated in FIG. 4A, the filler can splash upward and stick to area A which is to be thermally sealed. This problem tends to arise particularly when a filler having low viscosity is introduced, and when a filler is introduced at high speeds.

Even if the filler remains in area A which is to be thermally sealed, the filler will not constitute an obstacle to the manufacturing of packaging bags in many cases. However, when a filler contains, for example, fine particulate solid matters, the solid matters are likely to be caught in the transversely sealed part, causing a degradation in quality of packaging bags and causing defective transverse sealing.

Also, in the operation of FIG. 4, since a pair of ironing rollers 125 nip the cylindrical film above the level of the filler, air is trapped in the manufactured packaging bag. When food or the like is packaged as a filler, such trapped air causes the food to spoil, the trapped air should be preferably limited to the smallest possible amount.

It is therefore a second object of the present invention to propose a vertical filling-packing machine and a method of manufacturing a packaging bag, which are capable of preventing a filler from sticking to an area which is to be transversely sealed, in order to satisfactorily form a transversely sealed part. A further object is to propose a vertical filling-packaging machine and a method of manufacturing a packaging bag, which are capable of thus satisfactorily forming a transversely sealed part, and further capable of minimizing air which is trapped in the packaging bag.

Means for Solving the Problem

To achieve the first object, a vertical filling-packaging machine of the present invention comprises a pair of flat part forming rollers disposed in opposition to each other across a cylindrical film for rotating while sandwiching the cylindrical film to carry the cylindrical film downward while forming a flat part in the cylindrical film, a sealing mechanism including a heater bar and a heater bar receiver for thermally sealing the flat part formed in the cylindrical film in a width direction thereof, a cutting mechanism disposed below the sealing mechanism and including a pair of members for cooling a thermally sealed part which has been thermally sealed by the sealing mechanism, and a cutter for cutting the thermally sealed part, and a driving mechanism for integrally holding the sealing mechanism and cutting mechanism, and for integrally moving the sealing mechanism and cutting mechanism along a direction in which the cylindrical film is carried.

According to the vertical filling-packaging machine of the present invention thus configured, the sealing mechanism and cutting mechanism can be moved along the direction in which the cylindrical film is carried using the driving mechanism. It is therefore possible to perform the thermal sealing, cooling, and cutting operations without moving the cylindrical film. Specifically, after a thermally sealed part (transversely sealed part) has been formed in the cylindrical film using the sealing mechanism, the sealing mechanism and cutting mechanism are moved using the driving mechanism. Subsequently, control is conducted to cool and cut the thermally sealed part using the cutting mechanism. Also, since the sealing mechanism and cutting mechanism are individually disposed independently of each other, the shape of the heater bar and heater bar receiver as well as cooling members are not limited, as compared with the conventional configuration which comprises them in a unit, and as a result a variety of types can be used. Further, since the driving mechanism integrally moves the sealing mechanism and cutting mechanism, the configuration and operation control are simplified as compared with a configuration which individually moves them.

Also, the vertical filling-packaging machine may further comprise a tension applying mechanism for sandwiching both end portions of the cylindrical film positioned below an area to be thermally sealed by the sealing mechanism to stretch the cylindrical film to the outer sides in the width direction prior to a thermal sealing operation by the sealing mechanism. With this mechanism, the part to be thermally sealed can be thermally sealed without creases, thus making it possible to satisfactorily form the thermally sealed part. Moreover, since the cylindrical film is nipped below the area to be thermally sealed when it is thermally sealed, the weight of the filler below the area to be thermally sealed is barely applied to the area that is to be thermally sealed. Accordingly, the area to be thermally sealed is prevented from spreading.

The driving mechanism may comprise a supporter for integrally supporting the sealing mechanism and cutting mechanism, a supporting shaft for supporting the supporter for linear movement in a direction along the direction in which the cylindrical film is carried, and a driving source for moving the supporter along the supporting shaft. More specifically, the driving mechanism may comprise a ball screw for moving the supporter, and the driving source may be a servo motor for rotating the ball screw. According to the driving mechanism thus configured, the moving distance of the supporter can be readily changed only by changing the electric signal applied to the servo motor. Therefore, this is suitable for manufacturing a wide variety of types of bags in different outline shapes. Also, since the driving source comprises the ball screw and servo motor, the positioning of the supporter, i.e., the positioning of the sealing mechanism and cutting mechanism, can be accomplished with relatively high accuracy.

Also, the cutter may be disposed in a groove formed in one of the pair of members, and may be configured to be capable of advancing and retracting to and from the cylindrical film, and the other one of the pair of members may be formed with a groove for the cutter to advance thereinto. Also, the sealing mechanism may be configured such that, instead of the heater bar and the heater bar receiver, another heater bar and another heater bar receiver different in outline shape from the heater bar and the heater bar receiver, respectively, can be attached to the sealing mechanism. Also, the cutting mechanism may be configured such that, instead of the pair of members, a pair of other members in outline shape different from the pair of members, respectively, can be attached to the cutting mechanism.

To achieve the second object, a packaging bag manufacturing method of the present invention is a packaging bag manufacturing method for introducing a filler into a cylindrical film from the lower end of an introduction nozzle, and for thermally sealing the cylindrical film, into which the filler has been introduced, in a width direction thereof, thereby manufacturing a packaging bag in which the filler is sealed. The method comprises the steps of sandwiching the cylindrical film together with the lower end periphery of the introduction nozzle by using a pair of members disposed in opposition to each other across the cylindrical film, while an area of the cylindrical film to be thermally sealed is positioned substantially above the pair of members, introducing the filler from the lower end of the introduction nozzle while the cylindrical film is nipped by the pair of members, carrying the cylindrical film until the area to be thermally sealed is positioned below the pair of members after the introduction of the filler, and transversely sealing the area to be thermally sealed in a width direction of the cylindrical film after carrying the cylindrical film.

The packaging bag manufacturing method of the present invention includes sandwiching the cylindrical film together with the lower end periphery of the introduction nozzle by a pair of members, and introducing the filler into the cylindrical film with the area to be thermally sealed being positioned above the pair of members. Therefore, even if the filler splashes within the cylindrical film during introduction of the filler, the filler will not stick to the area that is to be thermally sealed. The present packaging machine subsequently carries the cylindrical film until the area that is to be thermally sealed is positioned below the pair of members, and transversely seals the area to be thermally sealed and to which filler is prevented from sticking, to manufacture a packaging bag. Since the present packaging machine transversely seals the area which is prevented from the filler sticking thereto, the filler is hardly caught in the transversely sealed part, resulting in a good packaging bag which is less susceptible to defective sealing.

Also, the step in the manufacturing method of the present invention that involves carrying the cylindrical film, may include sandwiching an area of the cylindrical film above the level of the introduced filler and below the area to be thermally sealed by a pair of flat part forming rollers disposed below the pair of members in opposition to each other across the cylindrical film, and carrying the cylindrical film downward while forming a flat part in the cylindrical film. In this way, the area of the cylindrical film to be thermally sealed can be thermally sealed after it has been squeezed into a flat shape. Thus, the transversely sealed part can be prevented from creasing. Also, in this event, since the pair of flat part forming rollers nip the cylindrical film at an intermediate position between the level of the introduced filler and the area to be thermally sealed, the introduced filler will not come into contact with the area to be thermally sealed.

Also, the manufacturing method of the present invention may further comprise the step of extruding air trapped in the cylindrical film sandwiched by the pair of flat part forming rollers and thereby maintained substantially in a sealed state prior to the thermal sealing step after the cylindrical film has been carried while forming the flat part. When a pair of flat part forming rollers are driven to sandwich the cylindrical film above the level of the introduced filler, air is trapped in the cylindrical film. Therefore, the step of extruding the trapped air is provided, thereby minimizing the amount of air included in the manufactured packaging bag.

Also, the manufacturing method of the present invention may further comprise the step of cutting the thermally sealed part formed in the thermal sealing step. In this way, the packaging bags are divided one by one. Further, the manufacturing method of the present invention may further comprise the step of stretching both end portions of the cylindrical film positioned in the vicinity which is the vicinity of the area to be thermally sealed, prior to the thermal sealing step. In this way, since creases and the like are prevented from occurring near the area to be thermally sealed, the transversely sealed part is more satisfactorily formed.

A vertical filling-packaging machine of the present invention comprises a pair of flat part forming rollers disposed in opposition to each other across a cylindrical film for rotating while sandwiching the cylindrical film to carry the cylindrical film downward while forming a flat part in the cylindrical film, a transverse sealing mechanism disposed below the pair of flat part forming rollers for thermally sealing the flat part formed in the cylindrical film in a width direction thereof, a carrying mechanism for carrying the cylindrical film downward while the pair of flat part forming rollers are not sandwiching the cylindrical film, an introduction nozzle disposed such that a lower end thereof is positioned above the pair of flat part forming rollers for introducing a filler into the cylindrical film from the lower end, and a liquid splash prevention mechanism including a pair of members disposed in opposition to each other across the cylindrical film for nipping the cylindrical film together with a lower end periphery of the introduction nozzle.

According to the vertical filling-packaging machine of the present invention thus configured, the packaging bag manufacturing method of the present invention can be used to manufacture a packaging bag having a satisfactory transversely sealed part which will never have any trapped filler.

The vertical filling-packaging machine of the present invention may further comprise a deairing mechanism disposed below the transverse sealing mechanism for extruding air trapped in the cylindrical film sandwiched by the pair of flat part forming rollers and thereby maintained substantially in a sealed state prior to a thermal sealing operation by the transverse sealing mechanism. Also, the vertical filling-packaging machine may further comprise a cutting mechanism disposed below the transverse sealing mechanism for cutting a thermally sealed part formed by the transverse sealing mechanism. Also, the vertical filling-packaging machine may further comprise a tension applying mechanism for sandwiching both end portions of the cylindrical film positioned in the vicinity which is the vicinity of an area to be thermally sealed by the sealing mechanism to stretch the cylindrical film to the outer sides in the width direction prior to a thermal sealing operation by the transverse sealing mechanism.

It should be noted that the "liquid splash prevention mechanism" prevents not only a liquid filler but also a pasty filler from splashing.

Effects of the Invention

As described above, according to the vertical filling-packaging machine of the present invention, since the sealing mechanism and cutting mechanism can be moved along the direction in which the cylindrical film is carried using the driving mechanism, it is possible to perform the thermal sealing, cooling, and cutting operations without moving the cylindrical film. Moreover, since the sealing mechanism and cutting mechanism are individually provided independently of each other, the heater bar and heater bar receiver as well as cooling members can be interchanged in various ways, thus making it possible to manufacture a wide variety of packaging bags in different outline shapes.

According to the method of manufacturing packaging bag and the vertical filling-packaging machine of the present invention, the cylindrical film is sandwiched together with the introduction nozzle using a pair of members of the liquid splash prevention mechanism, and the filler introducing operation is performed with the area to be thermally sealed being positioned above the pair of members, thereby preventing the filler from sticking to the area to be thermally sealed during the introduction of the filler. By thermally sealing the area that is to be thermally sealed, to which filler is thereby prevented from sticking in this way, it is possible to form a satisfactory transversely sealed part which will never have any trapped filler.

Also, even when a pair of flat part forming rollers are driven to sandwich the cylindrical film above the level of the introduced filler in order to prevent the introduced filler from coming into contact with the area to be transversely sealed, air trapped in the packaging bag can be minimized by extruding the air using the deairing mechanism.

The above and other objects, features, and advantages of the present invention will become apparent from the following description with reference to the accompanying drawings which illustrate an example of the present invention.

BRIEF DESCRIPTION OF THE DRAWINGS

FIGS. 3A and 3B are diagrams illustrating the configuration of a conventional transverse sealing and cutting mechanism which performs all the thermal sealing, cooling, and cutting operations without moving the cylindrical film.

FIGS. 4A-4C are diagrams illustrating another example of an operation for manufacturing a packaging bag by the conventional vertical filling-packaging machine of FIG. 1.

FIGS. 6A and 6B are cross-sectional views illustrating the valve structure on a lower end side of an introduction nozzle.

FIG. 7 is a lateral view illustrating the configuration of a liquid splash prevention mechanism.

FIGS. 13A and 13B are diagrams for describing the configuration and operation of a deairing mechanism.

FIGS. 14A-14C are diagrams for describing a packaging bag manufacturing operation by the packaging machine of FIG. 5.

FIGS. 15D-15F are diagrams for describing a packaging bag manufacturing operation by the packaging machine of FIG. 5.

FIGS. 16G-16I are diagrams for describing a packaging bag manufacturing operation by the packaging machine of FIG. 5.

FIGS. 17J-17L are diagrams for describing a packaging bag manufacturing operation by the packaging machine of FIG. 5.

DESCRIPTION OF REFERENCE NUMERALS

1 Vertical Filling-Packaging Machine
6 Vertical Sealing Mechanism
7 Film Feeding Belt
8 Introduction Nozzle
8a Introduction Nozzle Pipe
8b Opening
8c Control Valve
20 Liquid Splash prevention mechanism
21a, 21b Liquid Splash Prevention Bars
22a, 22b Air Cylinders
23a, 23b Covers
25 Flat Part Forming Roller
30 Transverse Sealing and Cutting Mechanism
31 Heater Bar
32 Heater Bar Receiver
40 Deairing Mechanism
41 First Deairing Plate
42 Second Deairing Plate
51 Bag Holding Plate
51a Supporting Shaft
60 Cylindrical Film
60a Flat Part
60b Side Edge Boundary
61 Sheet-Type Film
65 Transversely Sealed Part
66 Packaging Bag
70 Smoothing Mechanism
71 Spring Hook
72 Coupling Lever
73 Tension Coil Spring
73a, 73b Contact Members
75 Supporting Shaft
76 Mat
77 Stopper
81 Supporter
82 Ball Screw
85, 86 Toggle Link
85a, 85b Coupling Arms
85c Rotating Shaft
85d Rotating Lever
85e Pulley
A Area to Be Thermally Sealed
SM1, SM2, SM3 Servo Motors

BEST MODE FOR CARRYING OUT THE INVENTION

In the following, embodiments of the present invention will be described with reference to the drawings.

Figure 5:
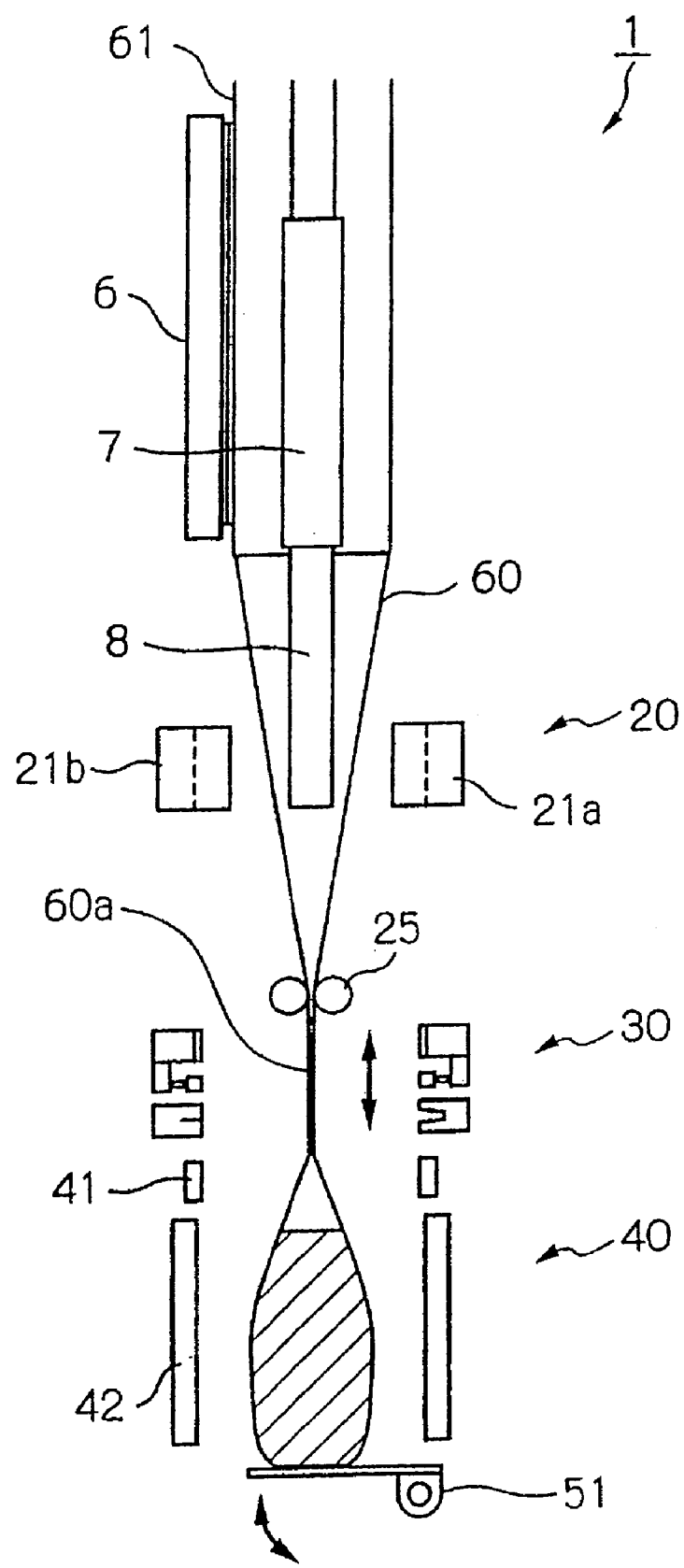
FIG. 5 is a diagram schematically illustrating the configuration of a vertical filling-packaging machine according to one embodiment of the present invention.

FIG. 5 is a diagram illustrating the configuration of vertical filling-packaging machine 1 according to one embodiment of the present invention.

Vertical filling-packaging machine 1 comprises vertically sealing mechanism 6 for thermally sealing the matching surfaces of sheet-type film 61 formed into a cylindrical shape by a bag forming guide, not shown, in a longitudinal direction to form cylindrical film 60; film feeding belt 7 for carrying cylindrical film 60 downward; introduction nozzle 8 for introducing filler into cylindrical film 60; liquid splash prevention mechanism 20 driven when the filler is introduced from introduction nozzle 8; a pair of flat part forming rollers 25 for squeezing cylindrical film 60 into a flat shape to form flat part 60a; transverse sealing and cutting mechanism 30 for transversely sealing flat part 60a and cutting the transversely sealed part to tear off a packaging bag; deairing mechanism 40 for extruding air trapped in cylindrical film 60 into which the filler has been introduced; and bag holding plate 51 for holding the bottom of cylindrical film 60 when deairing mechanism 40 is driven.

It should be noted that vertically sealing mechanism 6 and film feeding belt 7 are typical ones used in this type of vertical packaging machine, so that a detailed description thereon is omitted.

Introduction nozzle 8 is provided for introducing a liquid or pasty filler into cylindrical film 60, and is disposed within a carrying path of cylindrical film 60. The lower end of introduction nozzle 8 is substantially at the same level as liquid splash prevention mechanism 20. In this way, the lower end of introduction nozzle 8 can be nipped by liquid splash prevention bars 21a, 21b of liquid splash prevention mechanism 20, as will be later described. In this connection, introduction nozzle 8 is disposed to be coaxial with cylindrical film 60 which has a substantially cylindrical cross-sectional shape, such that the filler can be uniformly introduced into cylindrical film 60.

Introduction nozzle 8 of this embodiment intermittently introduces the filler, and has a valve structure on its lower end side, as illustrated in FIG. 6. Control valve 8c is vertically movably arranged in introduction nozzle pipe 8a for transporting the filler. By moving control valve 8c to open/close opening 8b of introduction nozzle pipe 8a, the filler introducing operation is controlled.

Figure 8:
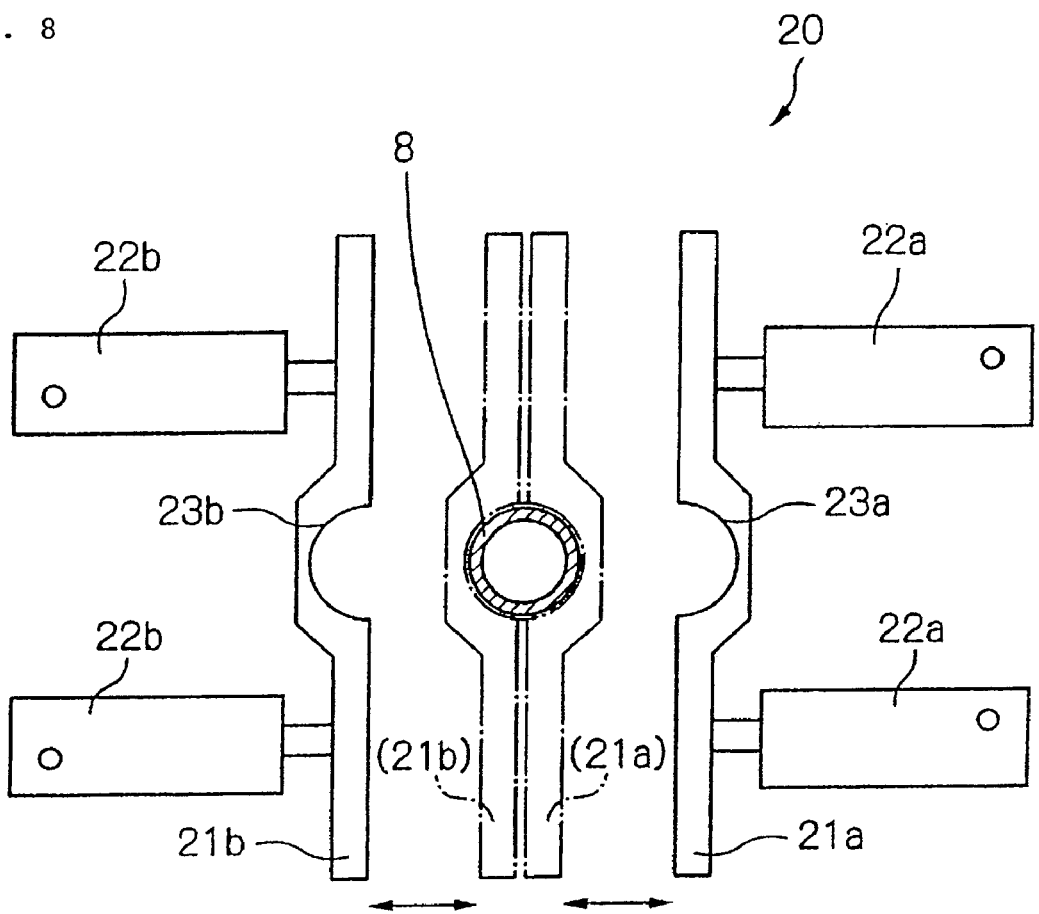
FIG. 8 is a top plan view illustrating the configuration of the liquid splash prevention mechanism.

FIG. 7 is a lateral view illustrating the configuration of liquid splash prevention mechanism 20, and FIG. 8 is a top plan view illustrating the configuration of the same liquid splash prevention mechanism 20.

Liquid splash prevention mechanism 20 has a pair of liquid splash prevention bars 21a, 21b which are disposed in opposition to each other across the carrying path of cylindrical film 60, as illustrated in FIGS. 7 and 8.

Liquid splash prevention bar 21a, 21b is formed with cover 23a, 23b near the center thereof, and cover 23a, 23b are flat on both sides. Covers 23a, 23b are shaped so as to surround introduction nozzle 8 along the periphery of introduction nozzle 8. More specifically, liquid splash prevention bars 21a, 21b are formed to define a constant distance to the periphery of introduction nozzle 8 when it is advanced.

Each liquid splash prevention bar 21a, 21b is attached to the leading end of an arm of air cylinders 22a, 22b, respectively. In this way, by driving air cylinders 22a, 22b, liquid splash prevention bars 21a, 21b move in directions perpendicular to the direction in which cylindrical film 60 is carried (horizontal direction as shown in FIG. 5), to take a position that is indicated by a solid line and a position that is indicated by a one-dot chain line.

Liquid splash prevention mechanism 20 thus configured uses liquid splash prevention bars 21a, 21b as an advanced position when the filler is introduced into cylindrical film 60 from introduction nozzle 8. As liquid splash prevention bars 21a, 21b are advanced, cylindrical film 60 is sandwiched between liquid splash prevention bars 21a, 21b and between the outer periphery of introduction nozzle 8 and each liquid splash prevention bar 21a, 21b and is thereby substantially sealed. In this event, since opening 8b at the lower end of introduction nozzle 8 opens into cylindrical film 60 in the substantially sealed state, there is no interference with the filler introducing operation.

The filler introducing operation of vertical filling-packaging machine 1 of this embodiment is performed during the period when an area to be thermally sealed is positioned above liquid splash prevention bars 21a, 21b, as will be later described. Therefore, even if the filler splashes during the introducing operation, the filler will not splash to the area to be thermally sealed because cylindrical film 60 is sandwiched by liquid splash prevention mechanism so that it remains substantially sealed.

In a conventional packaging machine which is not equipped with such mechanism 20, when filler with low viscosity, which is more likely to be splashed, is introduced, by way of example, the filler must be introduced at lower introduction speeds. However, since liquid splash prevention mechanism 20 is provided, this embodiment is free from the problem in which filler sticks to an area to be thermally sealed even if the filler is introduced at high speeds. It is therefore possible to perform the introducing operation at higher speeds, resulting in a reduction in cycle time for manufacturing a single packaging bag.

Flat part forming rollers 25 are disposed in opposition to each other across the carrying path of cylindrical film 60 below the lower end of introduction nozzle 8. Flat part forming rollers 25 are configured in a manner similar to ironing rollers typically used in this type of packaging machine, and rotate with cylindrical film 60 nipped therebetween. In this way, cylindrical film 60 is squeezed to form flat part 60a. Accordingly, flat part forming rollers 25 preferably have a length such that they can squeeze cylindrical film 60 over the entire width thereof. Flat part forming rollers 25 are disposed such that they can be advanced and retracted by a driving source, not shown, in directions perpendicular to the direction in which cylindrical film 60 is carried. Also, flat part forming rollers 25 are configured to be driven by another similar driving source, not shown, to rotate themselves. In this connection, flat part forming rollers 25 are driven to rotate in synchronization with film feeding belt 7.

Flat part forming rollers 25 thus configured are used to divide the filler introduced into cylindrical film 60, and are used to nip cylindrical film 60 above the level of the introduced filler.

As flat part forming rollers 25 are driven to rotate with cylindrical film 60 sandwiched therebetween, cylindrical film 60 is carried downward while flat part 60a is formed. Flat part 60a is an area in which cylindrical film is transversely sealed in a subsequent step. When flat part 60a is transversely sealed in this way, the transversely sealed part is less susceptible to creases.

Figure 9:
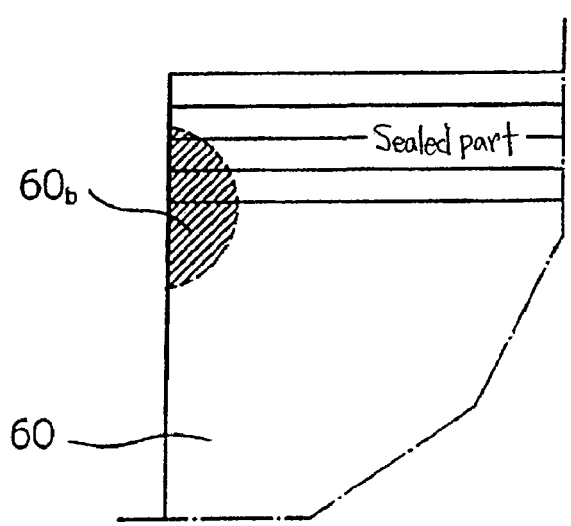
FIG. 9 is a diagram for describing problems when flat part forming rollers are not used.

Flat part forming rollers 25 also have a function of squeezing cylindrical film 60 to put folds on the edges of both sides. If cylindrical film 60 is thermally sealed without putting the folds on the edges of the sides, side edge boundary part 60b, shown in FIG. 9, can be broken depending on the condition of cylindrical film 60. Therefore, the folds put on cylindrical film 60, like those in this embodiment, are preferable in view of the ability to prevent the film, which is susceptible to the problems as mentioned above, from being broken when it is transversely sealed.

Figures 10, 10A, 10B:
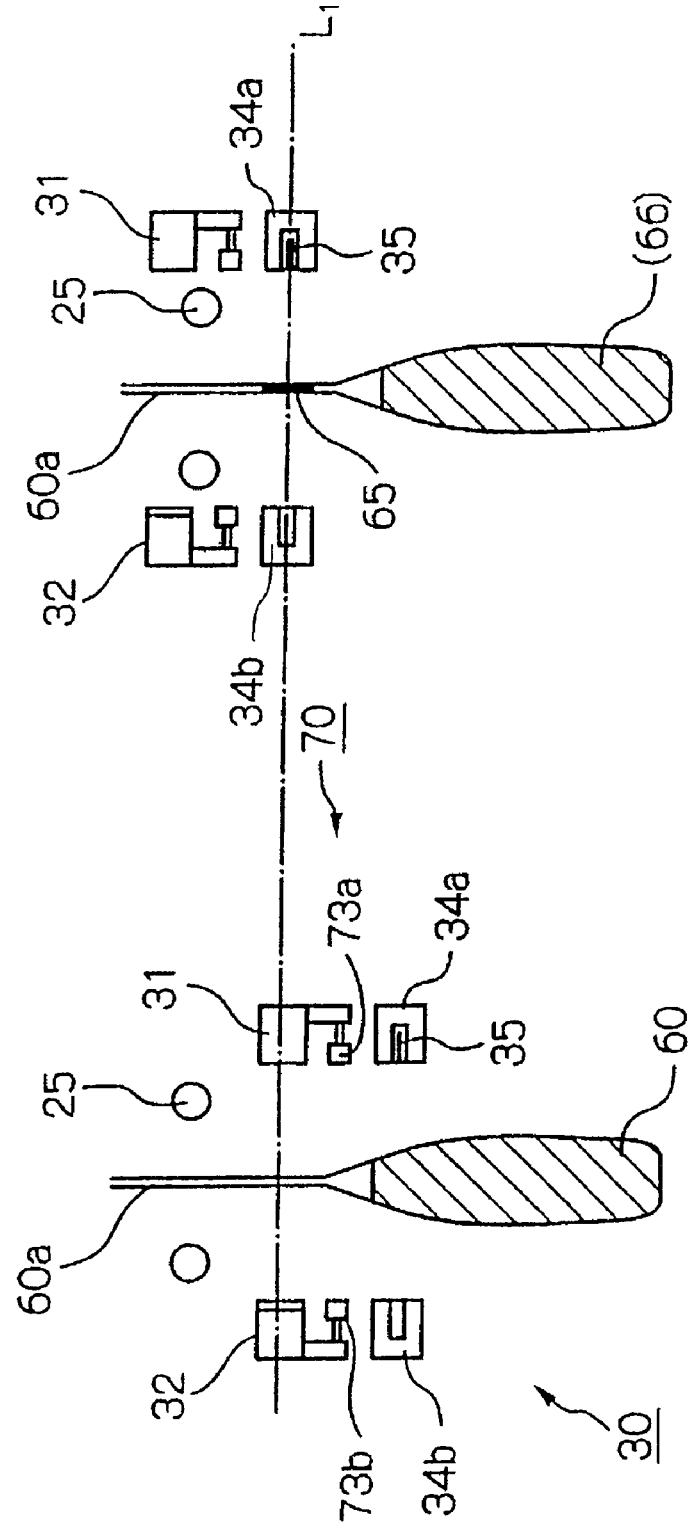
FIGS. 10A and 10B are diagrams for describing the configuration and operation of a transverse sealing and cutting mechanism.

Transverse sealing and cutting mechanism 30 comprises heater bar 31 and heater bar receiver 32 for transverse sealing operation; smoothing mechanism 70 disposed beneath them; and a pair of cooling bars 34a, 34b for cooling and cutting a transversely sealed part, as illustrated in FIG. 10. Also, cutter 35 is provided in cooling bar 34a for cutting cylindrical film 60.

Heater bar 31 and heater bar receiver 32 are disposed in opposition to each other across the carrying path of cylindrical film 60, and are respectively configured for movement in the direction perpendicular to the direction in which cylindrical film 60 is carried. Heater bar 31 and heater bar receiver 32 are driven by a driving source, later described with reference to FIG. 12, and can nip cylindrical film 60 therebetween.

Heater bar 31 contains a heater (not shown) for heating cylindrical film 60. On the other hand, silicone rubber is adhered on a surface opposite to heater bar 31 of heater bar receiver 32. Flat part 60a of cylindrical film 60 is sandwiched, pressurized, and heated by heater bar 31 and heater bar receiver 32 to form transversely sealed part 65 over the entire width of cylindrical film 60.

Figure 11:
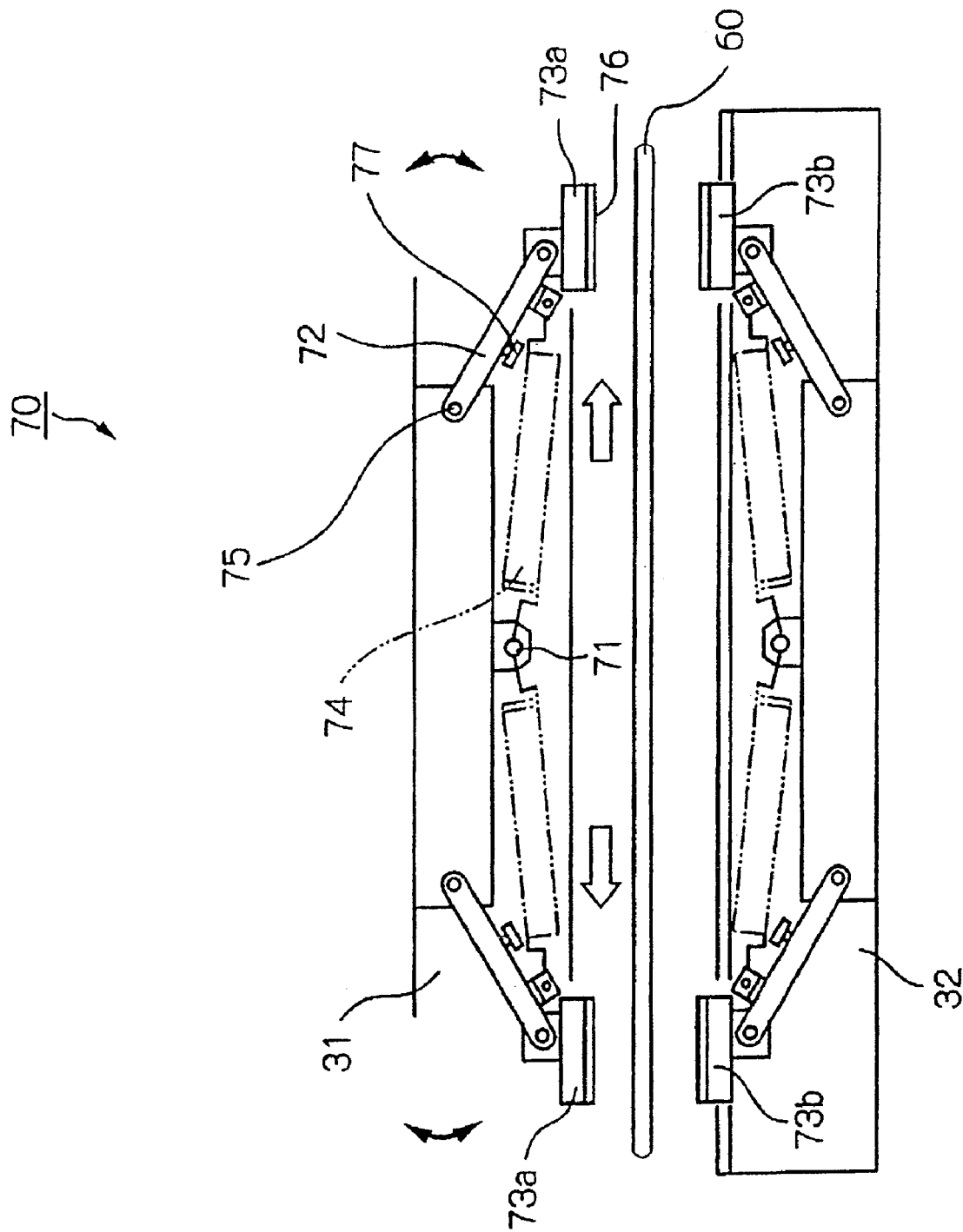
FIG. 11 is a diagram for describing the configuration of a smoothing mechanism.

Smoothing mechanism 70 will be described with reference to FIG. 11. FIG. 11 is a diagram of heater bar 31 and heater bar receiver 32 as viewed from below. In this connection, since smoothing mechanism 70 is similar in configuration to that disclosed in JP-A-2002-234504 which was previously filed by the present applicant, a detailed description thereon is omitted.

Smoothing mechanism 70 comprises one pair each of contact members 73a, 73b which come into contact with cylindrical film 60, which has been squeezed into a flat shape by flat part forming rollers 25, to stretch the film toward both sides (see outlined arrows). Mat 76 made of an elastic material such as rubber is adhered on a front surface of each contact member 73a, 73b such that cylindrical film 60 can be stretched. A material that is selected for mat 76 does not exert excessive frictional force on cylindrical film 60 such that this would cause cylindrical film 60 to spread when sandwiched cylindrical film 60 is stretched in the directions of the arrows.

Since each contact member 73a, 73b is attached in a similar structure, one contact member 73a will be described below as a representative example. Contact member 73a is pivotably supported by one end of coupling lever 72, and the opposite end of coupling lever 72 is pivotably supported by supporting shaft 75. Therefore, as coupling lever 72 is pivoted about supporting shaft 75, contact member 73a pivotally moves in a direction indicated by an arrow. Also, tension coil spring 74 hooked on spring hook 71 has the other end hooked at the leading end of coupling lever 72. By the action of tension coil spring 74 and stopper 77, contact member 73a is positioned closer to cylindrical film 60 than other structure components, as illustrated, in the initial state of smoothing structure 70.

Smoothing mechanism 70 thus configured operates when heater bar 31 and heater bar receiver 32 are advanced. Specifically, as heater bar 31 and heater bar receiver 32 are advanced toward cylindrical film 60, contact members 73a, 37b, which are opposite each other, sandwich both end sides of cylindrical film 60 therebetween before heater bar 31 and heater bar receiver 32 come into contact with cylindrical film 60. As heater bar 31 and heater bar receiver 32 are further advanced in this state, contact members 73a, 73b move toward the outer sides of cylindrical film 60, respectively, while they rub against cylindrical film 60. Thus, cylindrical film 60 is held while creases are removed by contact members 73a, 73b. Consequently, cylindrical film 60 is satisfactorily subjected to pressure and heated by heater bar 31 and heater bar receiver 32.

As described above, contact members 73a, 73b of smoothing mechanism 70 sandwich cylindrical film 60 below an area to be thermally sealed (below heater bar 31) during the thermal sealing operation, so that the load that is applied to the thermally sealed part by the filler becomes lighter until the thermal sealing operation is completed. Thus, the thermally sealed part is prevented from spreading due to the weight of the filler.

Cooling bars 34a, 34b are disposed below smoothing mechanism 70, as illustrated in FIG. 10, and they are driven by a driving source, later described with reference to FIG. 12, to nip transversely sealed part 65 of cylindrical film 60 therebetween. Also, since cooling bars 34a, 34b thermally transmit heat of thermally sealed part 65 to these members to cool transversely sealed part 65, they are preferably made of a material having high thermal conductivity.

One cooling bar 34a is provided with cutter 35 in a groove formed in cooling bar 34a for cutting transversely sealed part 65 to separate packaging bag 66 from cylindrical film 60. Cutter 35 is movably configured to advance to and to retract from cylindrical film 60 by a driving source, not shown. Opposite cooling bar 34b is formed with a groove for receiving cutter 35 when it advances for a cutting operation.

In this connection, heater bar 31 and heater bar receiver 32 as well as a pair of cooling bars 34a, 34b are all configured to be interchangeable with those of other types having outline shapes different from them. In conventional transverse sealing and cutting mechanism 230 as illustrated in FIG. 3, the integrated mechanism must be entirely interchanged in order to manufacture, for example, packaging bags having different shapes. However, transverse sealing and cutting mechanism 30 of this embodiment facilitates an exchanging operation because only heater bar 31 and cooling bars 34a, 34b need be interchanged with those of different types. Also, since a plurality of integrated mechanisms need not be provided in accordance with the shapes of packaging bags, the facility cost can be restrained.

Foregoing heater bar 31 and heater bar receiver 32, smoothing mechanism 70, and a pair of cooling bars 34a, 34b are integrally held by a supporter (see FIG. 12), later described, and integrally move in a vertical direction along the carrying path of cylindrical film 60. The position shown in FIG. 10A indicates the lower end position of their movable range, while the position shown in FIG. 10B indicates the upper end position.

At the lower end position in FIG. 10A, heater bar 31 and heater bar receiver 32 are positioned at the same height as packaging bag cutting position L1. The thermal heating is performed by driving heater bar 31 and heater bar receiver 32 in this state. On the other hand, at the upper end position in FIG. 10B, transverse sealing and cutting mechanism 30 has entirely moved upward to take a position at the same height as packaging bag cutting position L1. Transversely sealed part 65 is cooled and cut by driving cooling bars 34a, 34b and cutter 35 in this state. In this connection, "packaging bag cutting position L1" indicates a position at which cylindrical film 60 is cut off by cutter 35, and is set at the center of transversely sealed part 65 in the direction in which cylindrical film 60 is carried.

Figure 12:
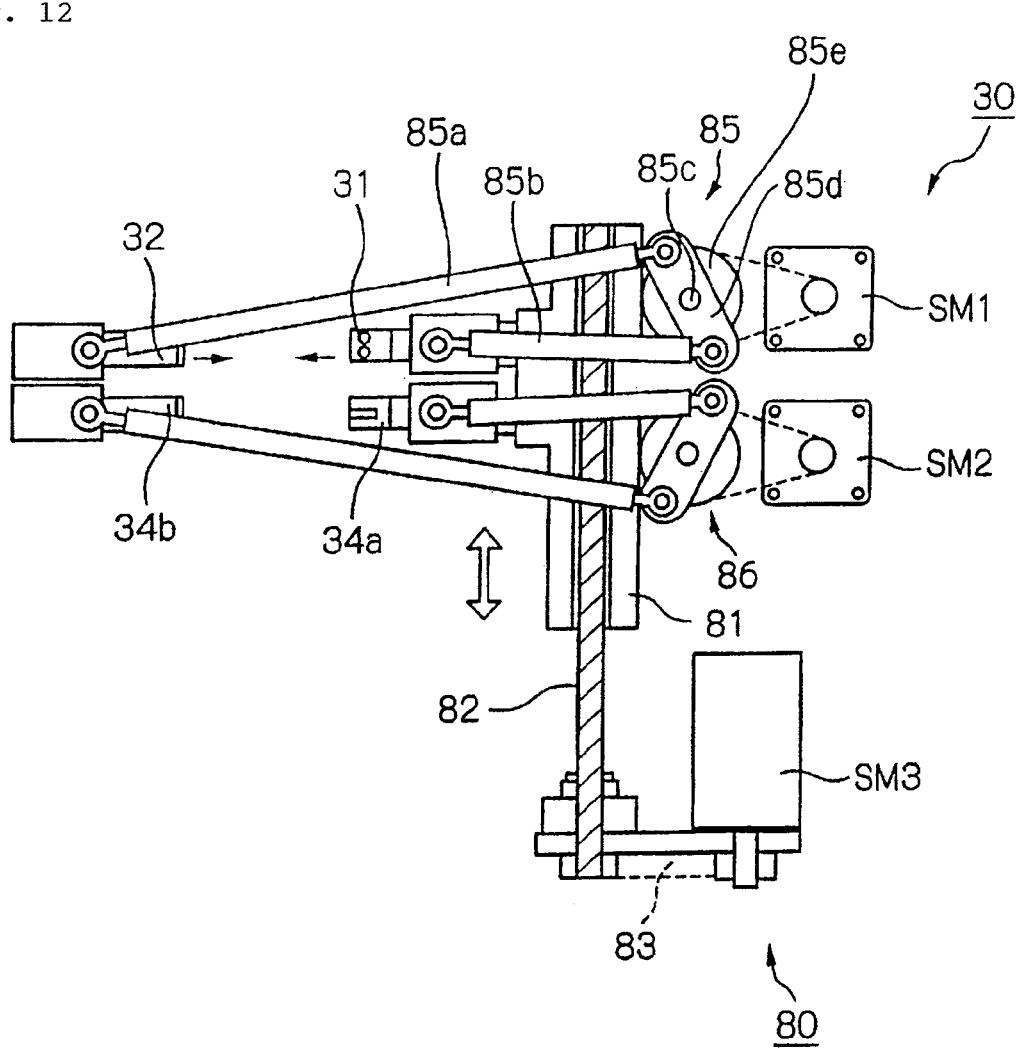
FIG. 12 is a diagram for describing the detailed configuration of the transverse sealing and cutting mechanism, and the configuration of a driving mechanism for moving the transverse sealing and cutting mechanism up and down.

Referring to FIG. 12, a description will be given of the detailed configuration of transverse sealing and cutting mechanism 30 and the configuration of driving mechanism 80 for moving transverse sealing and cutting mechanism 30 up and down. For simplifying the description, smoothing mechanism 70 is omitted from the illustration of FIG. 12.

Heater bar 31 and heater bar receiver 32 as well as a pair of cooling bars 34a, 34b are all configured to be driven by servo motors SM1, SM2, such that their power is transmitted through toggle links 85, 86. In the following, a mechanism for opening and closing heater bar 31 and heater bar receiver 32 will be described as a representative example.

Toggle link 85 is a link mechanism for converting rotational motions of servo motor SM1 to motions for opening and closing heater bar 31 and heater bar receiver 32. The power of servo motor SM1 is transmitted to rotating shaft 85c through a belt stretched between the output shaft of servo motor SM1 and pulley 85e. Rotating lever 85d is fixed to rotating shaft 85c. One end of this rotating lever 85d and heater bar 31 are coupled by coupling arm 85b, while the opposite end of rotating lever 85d and heater bar receiver 32 are coupled by coupling arm 85a. In toggle link 85, when heater bar 31 is in abutment to heater bar receiver 32, coupling arms 85a, 85b and rotating lever 85d are all in a horizontal state. In this way, even if horizontal loads, that are attempting to open heater bar 31 and heater bar receiver 32, are applied to heater bar 31 and heater bar receiver 32, respectively, the loads are unlikely to be converted to rotational motions of rotating lever 85d. Therefore, heater bar 31 and heater bar receiver 32 are allowed to stably pressurize cylindrical film 60. Such a link mechanism is also advantageous in that servo motor SM1 is required to generate a small amount of power.

Driving mechanism 80 for moving transverse sealing and cutting mechanism 30 up and down comprises supporter 81 for holding transverse sealing and cutting mechanism 30; ball screw 82 for moving supporter 81 up and down; and servo motor SM3 which is a driving source for rotating ball screw 82.

Supporter 81 integrally holds heater bar 31 and heater bar receiver 32, a pair of cooling members 34a, 34b, respective toggle links 85, 86 for opening and closing them, and servo motors SM1, SM2. Supporter 81 is vertically movably arranged along guide members which comprise, for example, two supporting shafts (not shown) disposed in parallel to each other with ball screw 82 interposed therebetween.

Ball screw 92 is assembled to be engaged in an engaging hole formed in supporter 81. Belt 83 is stretched between the lower end of ball screw 82 and the output shaft of servo motor SM3 for transmitting the power of servo motor SM3.

Driving mechanism 80 thus configured applies servo motor SM3 with a predetermined electric signal from a controller, not shown, to rotate servo motor SM3 by a predetermined amount, causing ball screw 82 to rotate in association therewith. In this way, heater bar 81, heater bar receiver 32, cooling bars 34a, 34b, and the like are integrally moved up and down and positioned at predetermined positions. The distance that is moved in this event can be changed only by changing the electric signal applied to servo motor SM3 from the controller. In addition, driving mechanism 80, which is composed of ball screw 82 and servo motor SM1, can relatively accurately position heater bar 81, heater bar receiver 32, cooling bars 34a, 34b, and the like.

When comparing the configuration for moving transverse sealing and cutting mechanism 30 relative to stationary cylindrical film 60, as in this embodiment, with the conventional configuration illustrated in FIG. 3, the configuration of this embodiment suffers from a degradation in positional accuracy due to transverse sealing and cutting mechanism 30 which is moved up and down using driving mechanism 80. However, in comparison with the conventional configuration for moving cylindrical film 60, as illustrated in FIG. 15, the configuration of this embodiment can accomplish the positioning with a higher positional accuracy.

Figure 1:
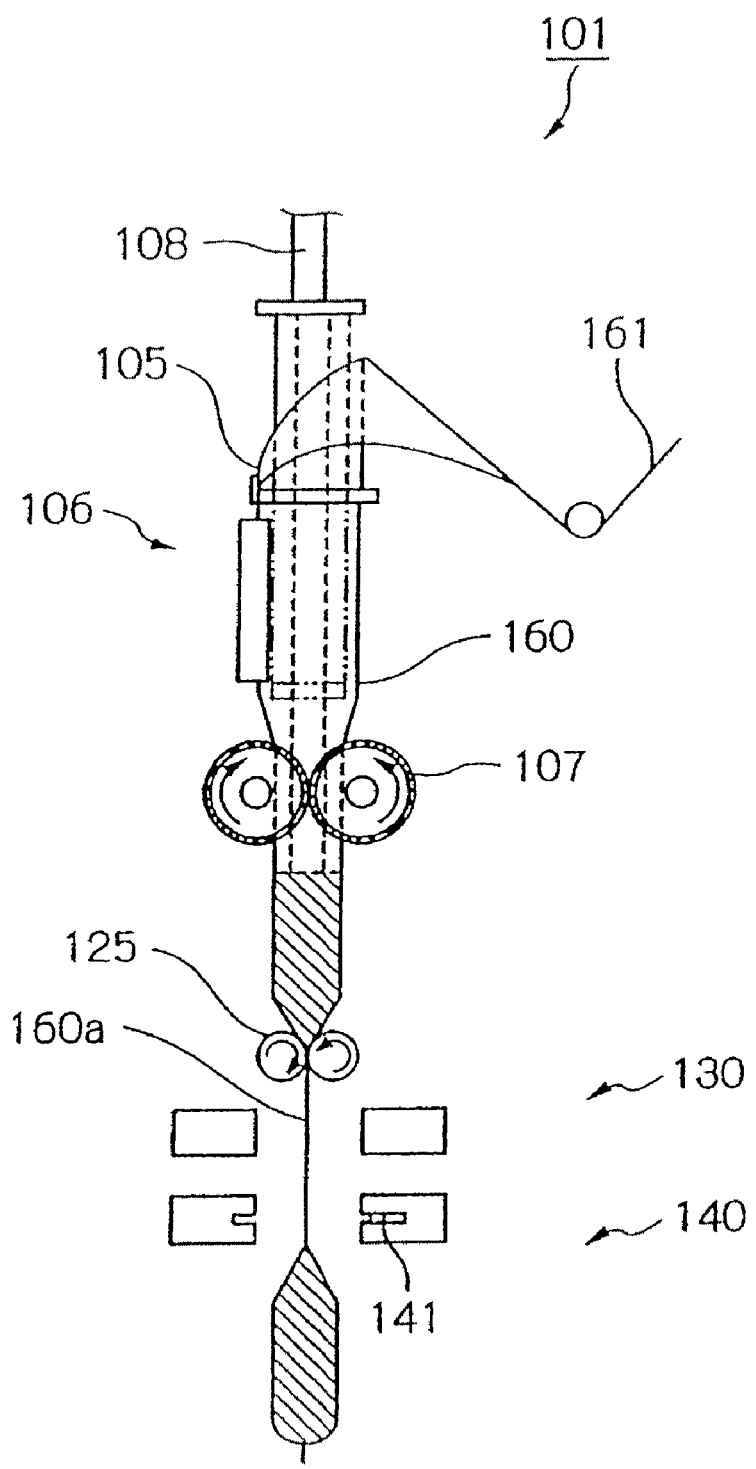
FIG. 1 is a diagram illustrating an example of conventional vertical filling-packaging machines.
Figure 2:
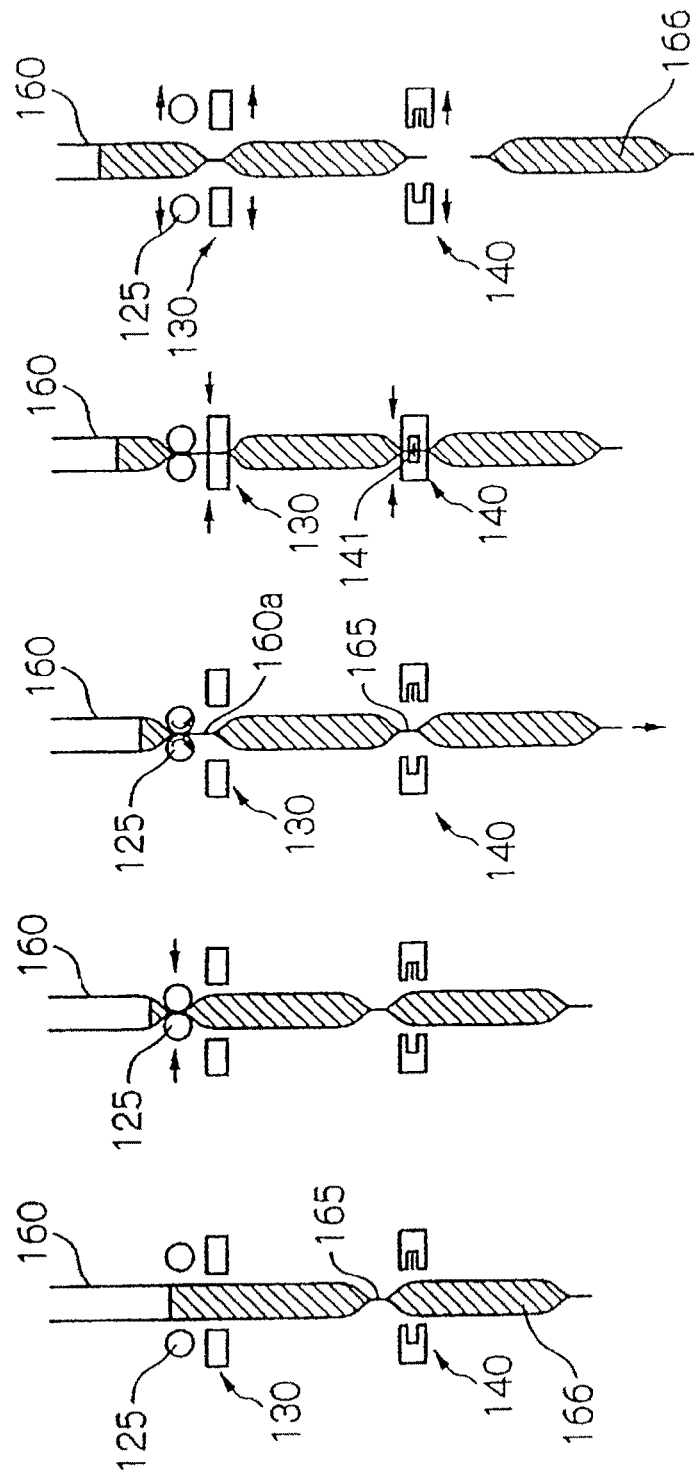
FIGS. 2A-2E are diagrams illustrating an example of an operation for manufacturing a packaging bag by the conventional vertical filling-packaging machine of FIG. 1.

The reason for the above will be described below. In the configuration as shown in FIG. 15, cylindrical film 60 is generally carried by film feeding belt 7 (see FIG. 1) provided in the form of a belt conveyer, film feeding rollers 107 (see FIG. 1) provided in the form of a pair of rotatable rollers, and the like. In this event, cylindrical film 60 is susceptible to variations in the amount of feed. On the other hand, in the configuration of FIG. 2 for moving cylindrical film 60, cylindrical film 60 must be again moved downward to the height of cooling bars 34a, 34b after it has been thermally sealed. In this way, in the configuration for intermittently and downwardly carrying cylindrical film 60 into which a filler has been introduced, the weight of the introduced filler is applied to cylindrical film 60 as an impact force, so that cylindrical film 60 can slightly spread in some cases. This spreading can vary the distance that cylindrical film 60 is carried. In particular, transversely sealed part 65, which has not been completely cooled, is susceptible to such spreading.

In contrast, in the configuration for stopping the carriage of cylindrical film 60 and for moving transverse sealing and cutting mechanism 30, as in this embodiment, though misregistration is caused by moving transverse sealing and cutting mechanism 30 itself, this misregistration is attributable to the mechanical structure of driving mechanism 80 for moving transverse sealing and cutting mechanism 30 up and down, so that the amount of misregistration is small as compared with the configuration for moving cylindrical film 60. Further, in this embodiment, since cylindrical film 60 need not be intermittently carried, cylindrical film 60 is less likely to spread due to the weight of the filler. In particular, transversely sealed part 65, not cooled, and is less likely to spread or deform.

Next, comparisons will be made among the configuration of this embodiment, the conventional configuration illustrated in FIG. 3, and the conventional configuration illustrated in FIG. 15 in regard to the time required from thermal sealing to cutting. Drawing a comparison between the configuration of this embodiment and the configuration of FIG. 3, the configuration of this embodiment requires a longer amount of time till the cutting by the time required to move transverse sealing and cutting mechanism 30 up and down, but the time is reduced in comparison with the configuration of FIG. 15. This is because the configuration for carrying cylindrical film 60 downward, as in the configuration of FIG. 15, experiences difficulties in carrying cylindrical film 60 at a certain predetermined speed or higher, for example, for reducing an impact force applied to cylindrical film 60.

The following control may be implemented in order to increase the speed of packaging bag manufacturing operations. In FIG. 10, the distance between cooling bars 34a, 34b is the same as the distance between heater bar 31 and heater bar receiver 32, but the distance between cooling bars 34a, 34b may be set shorter. At the upper end position of transverse sealing and cutting mechanism 30, heater bar 31 and heater bar receiver 32 are substantially at the same height as flat part forming rollers 25. It is therefore necessary to ensure a longer distance between heater bar 31 and heater bar receiver 32 than the distance between flat part forming rollers 25 such that heater bar 31 and heater bar receiver 32 do not interfere with flat part forming rollers 25. On the other hand, since cooling bars 34a, 34b will not interfere with flat part forming rollers 25, the distance between cooling bars 34a, 34b can be reduced. This results in a shorter distance over which cooling bars 34a, 34b move, thus making it possible to drive them at higher speeds. In this connection, the distance between cooling bars 34a, 34b may be adjusted only by changing the electric signal applied to servo motor SM2 shown in FIG. 12.

Deairing mechanism 40 and bag holding plate 51 will be described below with reference to FIG. 13. It should be noted that FIG. 13 illustrates only flat part forming rollers 25 but does not illustrate transverse sealing and cutting mechanism 30 disposed between flat part forming rollers 25 and deairing mechanism 40.

Bag holding plate 51 is a member for holding the bottom of cylindrical film 60 into which a filler has been introduced, and comprises a tabular member. Bag holding plate 51 has one end side pivotably supported by supporting shaft 51a, and is configured to have a horizontal state, indicated by a solid line in FIG. 13B, and an inclined state, indicated by a one-dot chain line, by means of a driving source, not shown. The horizontal state of bag holding plate 51 is taken when deairing mechanism 40 performs a deairing operation, later described, and when transverse sealing and cutting mechanism 30 transversely seals and cuts cylindrical film 60 after the deairing operation. On the other hand, the inclined state is selected in order to drop one packaging bag 66 that is held on bag holding plate 51. In this connection, a belt conveyer (not shown), for example, is disposed below bag holding plate 51a, such that packaging bag 66 is carried to a container, not shown.

Deairing mechanism 40 comprises first deairing plates 41a, 41b and second deairing plates 42a, 42b which are disposed opposite to each other across the carrying path of cylindrical film 60. Any of the deairing plates is arranged movably in direction perpendicular to the direction in which the cylindrical film is carried, and a driving source for first deairing plates 41a, 41b is provided independently of a driving source for second deairing plates 42a, 42b. In this way, first deairing plates 41a, 41b and second deairing plates 42a, 42b can be driven independently of each other.

Second deairing plates 42a, 42b are members for pressing cylindrical film 60, into which filler has been introduced, from both sides to extrude air within cylindrical film 60. Then, they are formed in a size that corresponds to the size of packaging bag 66 such that they can favorably perform their pressing operation. On the other hand, first deairing plates 41a, 41b are members for preventing the filler within cylindrical film 60 from being pushed upward during the deairing operation, and are disposed above second deairing plates 42a, 42b.

A description will be given of the operation of deairing mechanism 40 thus configured.

First, first deairing plates 41a, 41b are brought closer to each other with the interposition of a gap therebetween wide enough to allow air within cylindrical film 60 to escape upward. Next, as second deairing plates 42a, 42b are advanced in directions in which they approach each other, cylindrical film 60 having filler introduced thereinto is pressed from both sides, and in association therewith, air within cylindrical film 60 is extruded upward from an area in which cylindrical film 60 is sandwiched by first deairing plates 41a, 41b to extract the air from cylindrical film 60.

In this connection, second deairing plates 42a, 42b are preferably arranged in such a manner that their moving distances are adjustable in order that the air within cylindrical film 60 can be favorably extruded in this deairing operation. In this way, the deairing operation can be performed to minimize the amount of air within cylindrical film 60 by adjusting the moving distances of second deairing plates 42a, 42b as appropriate in accordance with the size of packaging bag 66 and the amount of filler. In addition, first deairing plates 41a, 41b may be brought closer to each other to such an extent that the filler is extruded upward with difficulty, even within a range in which the air can be smoothly extruded. Nevertheless, even if the filler is extruded beyond first deairing plates 41a, 41b, the transverse sealing operation will not be adversely affected unless the level of the filler reaches area A that is to be thermally sealed, as shown in FIG. 13B.

Referring to FIGS. 14 to 17, a description will be given below of packaging bag manufacturing operations of vertical filling-packaging machine 1 of this embodiment configured as described above.

In an initial state illustrated in FIG. 14A, one packaging bag has been manufactured in the preceding manufacturing step, and the thermally sealed lower end of cylindrical film 60 lies at packaging bag cutting position L1. Liquid splash prevention mechanism 20 in turn is in a closed state. Cylindrical film 60 is sandwiched by liquid splash prevention bars 21a, 21b substantially into a flat shape, and is substantially in a sealed state. However, cylindrical film 60 is not completely flat, but an area sandwiched by introduction nozzle 8 and liquid splash prevention bars 21a, 21b bulges along the periphery of introduction nozzle 8. Flat part forming rollers 25, transverse sealing and cutting mechanism 30 and deairing mechanism 40 are all set in an open state, while bag holding plate 51 is placed in a horizontal state. Transverse sealing and cutting mechanism 30 is positioned at the lower end of its movable range, and heater bar 31 and heater bar receiver 32 are positioned at the same height as packaging bag cutting position L1. Area A, which is to be thermally sealed in a transverse sealing step, later described, is positioned above liquid splash prevention mechanism 20.

Next, as illustrated in FIG. 14B, the introduction of a filler is started from introduction nozzle 8 with liquid splash prevention mechanism 20 maintained in a closed state. The filler will not stick to area A that is to be thermally sealed because cylindrical film 60 is sandwiched by liquid splash prevention mechanism 20.

Next, as illustrated in FIG. 14C, the introducing operation is continued until the introduced filler reaches the amount for a single bag to be sealed in packaging bag 66 (see FIG. 17). Liquid splash prevention mechanism 20 is switched to an open state in the middle of this introducing operation. In this connection, the introducing operation may be once stopped when liquid splash prevention mechanism 20 is opened, or may be continued as is.

Liquid splash prevention mechanism 20 is opened in the middle of the introducing operation with the intention of allowing air within cylindrical film 60 to escape to the outside. As described above, cylindrical film 60 remains substantially sealed while liquid splash prevention mechanism 20 is closed. Therefore, if one attempts to introduce an amount of the filler for one bag as it is, air within the cylindrical film cannot escape, with the result that pressure becomes higher within cylindrical film 60 as more and more filler is introduced. When pressure is applied to cylindrical film 60 in this way, cylindrical film 60 can bulge and become deformed, or the thermally sealed part can break at the lower end of cylindrical film 60. Also, the air that is under high pressure as a result of the pressure which has increased within the cylindrical film can be extruded from a slight gap which has become narrow due to liquid splash prevention bars 21a, 21b. If air is extruded from a slight gap in this way, the air will flow at a high speed, so that if the filler is sticking near a gap between liquid splash prevention bars 21a, 21b, the filler can be blown up by the air flow.

Also, even if liquid splash prevention mechanism 20 is opened in the middle of the introducing operation as described above, there is a relatively low likelihood that the filler will stick to area A that is to be thermally sealed for the following reason. When the filler is introduced into empty cylindrical film 60 which is nipped by liquid splash prevention mechanism 20 and is substantially flat as in this embodiment, the filler is most likely to splash immediately after the start of the introducing operation. However, when the filler is introduced into cylindrical film 60 into which a certain amount of the filler has already been introduced, the filler does not splash much.

In this connection, since liquid splash prevention mechanism 20 of this embodiment uses air cylinders 22a, 22b (see FIG. 8) as driving sources to move liquid splash prevention bars 21a, 21b, liquid splash prevention bars 21a, 21b are completely opened away from each other, so that they are in an open state, as illustrated in FIG. 13C. However, the driving sources may be changed to servo motors or the like instead of the air cylinders, and in such a structure, the servo motors can be used to adjust the opening defined between liquid splash prevention bars 21a, 21b. In this event, liquid splash prevention bars 21a, 21b are not completely opened away from each other, but are preferably brought close to each other with the interposition of a gap large enough to allow air within cylindrical film 60 to escape. In this way, cylindrical film 60 can be squeezed even during the latter half of the introducing operation, thus further preventing the filler from sticking to area A which is to be thermally sealed.

Next, as illustrated in FIG. 15D, film feeding belt 7 (see FIG. 5) is driven to carry cylindrical film 60 downward. This carrying operation is performed until the level of the introduced filler falls below flat part forming rollers 25.

Next, as illustrated in FIG. 15E, cylindrical film 60 is nipped by flat part forming rollers 25 while the carriage of cylindrical film 60 is stopped. In this event, a predetermined amount of air is trapped within cylindrical film 60 below the area which is sandwiched by flat part forming rollers 25.

Next, as illustrated in FIG. 15F, flat part forming rollers 25 are driven to rotate, thereby carrying cylindrical film 60 downward while flat part 60a is being formed. It should be noted that, in this event, film feeding belt 7 is simultaneously driven as well. This carrying operation is performed until the bottom of cylindrical film 60 is held on bag holding plate 51, and area A to be thermally sealed is sandwiched by heater bar 31 and heater bar receiver 32.

Next, as illustrated in FIG. 16G, deairing mechanism 40 is driven to extrude the air trapped in cylindrical film 60 while the bottom of cylindrical film 60 is held on the bag holding plate.

First, first deairing plates 41a, 41b are brought closer to each other to narrow an upper portion of cylindrical film 60 to such an extent that air can escape. In addition, flat part forming rollers 25, which have been nipping cylindrical film 60, are slightly moved in directions in which they separate from each other. In this way, a flow path is ensured for the air to be extruded.

Next, second deairing plates 42a, 42b are advanced to press cylindrical film 60 from both sides. Then, the air trapped in cylindrical film 60 is extruded upward beyond the area sandwiched by first deairing plates 41a, 41b. In this event, the filler is prevented from rising to area A which is to be thermally sealed, by bringing first deairing plates 41a, 41b closer to each other to such an extent that the filler is hardly extruded, and by adjusting moving amounts of second deairing plates 42a, 42b as appropriate.

In this connection, first deairing plates 41a, 41b and second deairing plates 42a, 42b can be driven at a variety of different timings which can be changed from one to another. For example, after second deairing plates 42a, 42b are first brought closer to each other, first deairing plates 41a, 41b may be controlled to approach to each other. In this event, as second deairing plates 42a, 42b are brought closer to each other, the level of the filler rises. Then, first deairing plates 41a, 41b are brought closer to each other, thereby further extruding the air within cylindrical film 60.

Alternatively, the first and second deairing plates may be substantially and simultaneously brought closer to each other. When the first and second deairing plates are controlled to substantially and simultaneously approach each other, some filler can splash upward due to an impact resulting from the excessively high speed at which second deairing plates 42a, 42b are brought closer to each other. As such, the timings at which the deairing plates are driven are preferably set as appropriate in accordance with the characteristics of the filler and the like. Preferably, for packaging filler which tends to splash, first deairing plates 41a, 41b are first brought closer to each other. Alternatively, first deairing plates 41a, 41b may be structurally designed to approach to each other earlier than second deairing plates 42a, 42b, such that first and second deairing plates are substantially and simultaneously brought closer to each other.

Next, as illustrated in FIG. 16H, cylindrical film 60 is sandwiched by heater bar 31 and heater bar receiver 32 of transverse sealing and cutting mechanism 30 to pressurize and to heat cylindrical film 60. This results in the formation of transversely sealed part 65 in cylindrical film 60. In this transverse sealing operation, area A of cylindrical film 60, which is thermally sealed, is held without creases by the action of smoothing mechanism 70 (see FIG. 11) disposed below heater bar 31 and heater bar receiver 32, so that the thermal sealing is favorably accomplished as a result.

Next, as illustrated in FIG. 16I, after heater bar 31 and heater bar receiver 32 have been retracted, transverse sealing and cutting mechanism 30 is completely raised until cutter 35 reaches the height of packaging bag cutting position L1, during the time when the carriage of cylindrical film 60 is stopped. Since this upward moving operation is performed by driving mechanism 80, the entire transverse sealing and cutting mechanism 30 is positioned with a relatively high positional accuracy.

Next, as illustrated in FIG. 17J, transversely sealed part 65 is nipped by cooling bars 34a, 34b so that it becomes cooled. In addition, cutter 35 disposed in cooling bar 34a is advanced to tear off packaging bag 66 from cylindrical film 60.

The timing of the cutting operation by cutter 35 is preferably set as appropriate by taking into consideration the material of cylindrical film 60, the size of transversely sealed part 65, and the like. For example, when cooling of transversely sealed part 65 does not require a long time, cutter 35 may be driven simultaneously during the time when cooling bars 34a, 34b are closed. On the other hand, when cooling of transversely sealed part 65 requires a long time, cutter 35 may be driven after a predetermined time once cooling bars 34a, 34b have been closed.

Next, as illustrated in FIG. 17K, cooling bars 34a, 34b are retracted to release packaging bag 66 from being held by cooling bars 34a, 34b, causing packaging bag 66 to fall onto bag holding plate 51. Then, bag holding plate 51 is brought into an inclined state, thereby causing packaging bag 66 to fall down.

Next, as illustrated in FIG. 17L, the respective components represented by transverse sealing and cutting mechanism 30 are returned to their positions in the initial state illustrated in FIG. 14A. Specifically, transverse sealing and cutting mechanism 30, which lies at the upper end position, is returned to the lower end position, flat part forming rollers 25, which have remained closer to each other with the interposition of a slight gap for the deairing operation, are opened, bag holding plate 51 is returned to the horizontal state, and liquid splash prevention mechanism 20 is returned to the closed state.

By repeating a series of the foregoing steps, packaging bags 66 with the filler sealed therein are manufactured in sequence.

As described above, vertical filling-packaging machine 1 according to this embodiment can integrally move heater bar 31 and heater bar receiver 32 that are provided as a sealing mechanism, and a pair of cooling members 34a, 34b that are provided as a cutting mechanism up and down, along the direction in which cylindrical film 60 is carried, by using driving mechanism 80 shown in FIG. 12. It is therefore possible to fully perform the thermal sealing, cooling, and cutting operations without moving cylindrical film 60. As such, cylindrical film 60 need not be intermittently fed downward, resulting in a lower possibility that cylindrical film 60 will spread because of an impact force that would otherwise occur if cylindrical film 60 is intermittently carried, and resulting in a lower possibility that transversely sealed part 65, that is not cooled, will spread or deform. Also, since the sealing mechanism and cutting mechanism are individually disposed independently of each other, heater bar 31 and heater bar receiver 32 as well as cooling bars 34a, 34b can be interchanged with those having different shapes in accordance with the specifications of packaging bag 66. Further, since driving mechanism 80 is provided to integrally move heater bar 31 and heater bar receiver 32 as well as cooling bars 34a, 34b, the configuration and operation control are simplified as compared with the configuration in which they individually move.

Also, as described above, vertical filling-packaging machine 1 of this embodiment introduces a filler from introduction nozzle 8 into cylindrical film 60 nipped by liquid splash prevention mechanism 20, with area A that is to be thermally sealed being positioned above liquid splash prevention mechanism 20. Consequently, the filler will not stick to area A that is to be thermally sealed, when the filler is introduced. Also, since liquid splash prevention mechanism 20 remains opened until the amount of filler for one bag has been completely introduced into cylindrical film 60, cylindrical film 60 or a sealed lower edge will not be deformed or broken due to the introduction of the filler.

Also, a pair of flat part forming rollers 25 are driven to nip cylindrical film 60 above the level of the introduced filler, and the introduced filler will not come into contact with area A that is to be thermally sealed in subsequent steps. In this way, area A that is to be thermally sealed is squeezed into a flat shape, and carried to heater bar 31 and to heater bar receiver 32 in this state for thermal sealing, without the filler sticking thereto or coming into contact therewith. Thus, thermally sealed part 65 is well formed and is less susceptible to defective sealing. Also, since the area that is pressurized and heated by heater bar 31 and heater bar receiver 32 has been previously squeezed into a flat shape, thermally sealed part 65/transversely sealed part 65 are prevented from having creases. In addition, in this embodiment, since smoothing mechanism 70 is provided for eliminating creases in area A that is to be thermally sealed near heater bar 31 and heater bar receiver 32, thermally sealed part 65/transversely sealed part 65 are more satisfactorily formed.

When a pair of flat part forming rollers 25 are driven to nip cylindrical film 60 above the level of the introduced filler, as described above, air is trapped in cylindrical film 60, as illustrated in FIG. 14E. However, this embodiment employs deairing mechanism 40 to extrude the air, thus minimizing the amount of air included in manufactured packaging bag 66.

It should be noted that in this embodiment, cylindrical film 60 is nipped above the level of the filler by using a pair of flat part forming rollers 25 as illustrated in FIG. 15, but, not limited to this, the filler may be divided by a pair of flat part forming rollers 25.

Essentially, this step of forming flat part 60*a* is not necessarily required depending on the material of cylindrical film 60 and the type of sealed filler. Even in this event, transversely sealed part 65 can be satisfactorily formed without the filler caught therein by carrying area A, that is to be thermally sealed, and to which the filler is prevented from sticking by the action of liquid splash prevention mechanism 20, to heater bar 31 and heater bar receiver 32, in order to thermally seal the same.

While a selected embodiment of the present invention has been described using particular terms, it should be understood that this description is exclusively intended for illustration, and modifications and variations can be made without departing from the spirit and scope of the following claims.

The invention claimed is:

1. A vertical filling-packaging machine comprising:
   a pair of flat part forming rollers disposed in opposition to each other across a cylindrical film for rotating while sandwiching the cylindrical film to carry the cylindrical film downward while forming a flat part in the cylindrical film;
   a sealing mechanism including a heater bar and a heater bar receiver for thermally sealing the flat part formed in the cylindrical film in a width direction thereof;
   a cutting mechanism disposed below said sealing mechanism and including a pair of members for cooling a thermally sealed part which has been thermally sealed by said sealing mechanism, and a cutter for cutting the thermally sealed part; and
   a driving mechanism for integrally holding said sealing mechanism and said cutting mechanism, and for integrally moving said sealing mechanism and said cutting mechanism along a direction in which the cylindrical film is carried,
   wherein said driving mechanism comprises:
   a supporter for integrally supporting said sealing mechanism and said cutting mechanism,
   a supporting shaft for supporting said supporter for linear movement in a direction along the direction in which the cylindrical film is carried, and
   a driving source for moving said supporter along supporting shaft.

2. The vertical filling-packaging machine according to claim 1, further comprising a tension applying mechanism for sandwiching both end portions of the cylindrical film positioned below an area to be thermally sealed by said sealing mechanism to stretch the cylindrical film to the outer sides in the width direction prior to a thermal sealing operation by said sealing mechanism.

3. The vertical filling-packaging machine according to claim 1, wherein said driving mechanism comprises a ball screw for moving said supporter, and said driving source is a servo motor for rotating said ball screw.

4. The vertical filling-packaging machine according to claim 1, wherein:
   said cutter is disposed in a groove formed in one of said pair of members, and is configured to be capable of advancing and retracting to and from the cylindrical film, and
   the other one of said pair of members is formed with a groove for said cutter to advance thereinto.

5. The vertical filling-packaging machine according to claim 1, wherein:
   said sealing mechanism is configured such that another heater bar and another heater bar receiver different in outline shape from said heater bar and said heater bar receiver, respectively, can be attached to said sealing mechanism instead of said heater bar and said heater bar receiver.

6. The vertical filling-packaging machine according to claim 1, wherein said cutting mechanism is configured such that a pair of other members in outline shape different from said pair of members, respectively, can be attached to said cutting mechanism instead of said pair of members.

* * * * *